(12) United States Patent
Curd et al.

(10) Patent No.: US 12,395,804 B1
(45) Date of Patent: Aug. 19, 2025

(54) SYSTEM AND METHOD FOR AN AUDIO REPRODUCTION DEVICE

(71) Applicant: SCAEVA TECHNOLOGIES, INC., Gilroy, CA (US)

(72) Inventors: Steven Elliott Curd, Gilroy, CA (US); Roustam Asimov, Minsk (BY); Tiffany Loverd, Taos, NM (US)

(73) Assignee: SCAEVA Technologies, Inc., San Jose, CA (US)

( * ) Notice: Subject to any disclaimer, the term of this patent is extended or adjusted under 35 U.S.C. 154(b) by 603 days.

(21) Appl. No.: 17/702,737

(22) Filed: Mar. 23, 2022

Related U.S. Application Data

(63) Continuation-in-part of application No. 17/481,936, filed on Sep. 22, 2021, now Pat. No. 11,545,130, which is a continuation-in-part of application No. 16/927,792, filed on Jul. 13, 2020, now Pat. No. 11,540,049.

(60) Provisional application No. 62/873,803, filed on Jul. 12, 2019.

(51) Int. Cl.
*H04S 7/00* (2006.01)
*H04L 9/32* (2006.01)
*H04S 1/00* (2006.01)

(52) U.S. Cl.
CPC .............. *H04S 7/30* (2013.01); *H04L 9/3263* (2013.01); *H04S 1/007* (2013.01); *H04S 2400/05* (2013.01)

(58) Field of Classification Search
CPC .. H04R 3/12; H04R 3/04; G06F 3/162; G06F 3/165; H04S 7/30; H04S 1/007; H04S 2400/05; H04L 9/3263
USPC ....... 381/1, 17, 18, 19, 303, 309, 26, 74, 98
See application file for complete search history.

(56) References Cited

U.S. PATENT DOCUMENTS

| | | | |
|---|---|---|---|
| 9,607,622 B2 * | 3/2017 | Okimoto | H04S 3/004 |
| 10,531,217 B2 * | 1/2020 | Nair | H04S 7/30 |
| 2004/0196991 A1 * | 10/2004 | Iida | H04S 1/005 |
| | | | 381/1 |

* cited by examiner

*Primary Examiner* — Xu Mei
(74) *Attorney, Agent, or Firm* — Minisandram Law Firm; Raghunath S. Minisandram

(57) ABSTRACT

System and method for enhancing audio reproduced by an audio reproduction device is disclosed. A spatial emulation appliance with a processor and memory is provided. Media content for reproduction is received by the spatial emulation appliance. A selection of a physical space to render the reproduction of the media content is received by the spatial emulation appliance. Convolved media content is generated by the spatial emulation appliance using filter coefficients, rendering logic and other parameters representative of the selected physical space. The convolved media content is presented for reproduction. A non-fungible token (NFT) is generated indicative of the authenticity and the spatial characteristics of the selected physical space.

12 Claims, 22 Drawing Sheets

SYSTEM AND METHOD FOR AN AUDIO REPRODUCTION DEVICE

CROSS-REFERENCE TO RELATED APPLICATIONS

This application is a continuation-in-part application of patent application Ser. No. 17/481,936, filed on Sep. 22, 2021, entitled "SYSTEM AND METHOD FOR AN AUDIO REPRODUCTION DEVICE", which is a continuation-in-part application of patent application Ser. No. 16/927,792 filed on Jul. 13, 2020, entitled "SYSTEM AND METHOD FOR AN AUDIO REPRODUCTION DEVICE", which claims priority to provisional patent application No. 62/873,803 filed on Jul. 12, 2019, entitled "SYSTEM AND METHOD FOR AN AUDIO REPRODUCTION DEVICE". Contents of application Ser. No. 17/481,936 is incorporated herein by reference, in its entirety. Contents of application Ser. No. 16/927,792 is incorporated herein by reference, in its entirety. Contents of application No. 62/873,803 is incorporated herein by reference, in its entirety.

TECHNICAL FIELD

The present invention relates generally to an audio reproduction device, and, more particularly, to a headphone.

DESCRIPTION OF RELATED ART

System and method for an audio reproduction device is described. Audio sound reproduction devices may include headphones and earbuds. Humans have evolved to hear sounds within physical spaces. The physical configuration of our two ears, our head between them, and the ways in which we perceive sound is the result of the interface with, and the physical characteristics of, the environment within which sounds are created and transported. However, since the introduction of the Walkman® in 1979, headphones (and later earbuds) became very popular ways to enjoy listening to sound. By closely coupling two sound transducers with our two ears independently, all environmental effects and the natural perception of sound are circumvented. This creates a synthetic, artificial listening environment, and substantially changes our psychoacoustic interpretation of the sounds that we hear.

Further, entertainment content such as music and film soundtracks are typically created in carefully designed physical environments (studios and sound stages). Therefore, by listening to the resulting music or film soundtracks through headphones, our psychoacoustic experience is typically significantly different from that which was intended by the creators, producers or editors of the content. This presents numerous problems. In some examples, creating content using headphones is highly challenging, therefore requiring carefully designed studio spaces and expensive monitor loudspeakers. In some examples, a listener's psychoacoustic experience while consuming audible content is different when accessed through loudspeakers versus headphones. There is a need to solve one or more of these problems. It is with these needs in mind, this disclosure arises.

SUMMARY OF THE INVENTION

In one embodiment, a method for enhancing audio reproduced by an audio reproduction device is disclosed. A spatial emulation appliance with a processor and memory is provided. A media content for reproduction is received by the spatial emulation appliance. A selection of a physical space to render the reproduction of the media content is received by the spatial emulation appliance. A convolved media content is generated by the spatial emulation appliance using filter coefficients representative of the selected physical space. The convolved media content is presented for reproduction.

In another embodiment, a system for enhancing audio reproduced by an audio reproduction device is disclosed. A spatial emulation appliance with a processor and memory is provided. A media content for reproduction is received by the spatial emulation appliance. A selection of a physical space to render the reproduction of the media content is received by the spatial emulation appliance. A convolved media content is generated by the spatial emulation appliance using filter coefficients representative of the selected physical space. The convolved media content is presented for reproduction.

This brief summary has been provided so that the nature of the disclosure may be understood quickly. A more complete understanding of the disclosure can be obtained by reference to the following detailed description of the preferred embodiments thereof in connection with the attached drawings.

BRIEF DESCRIPTION OF THE DRAWINGS

The foregoing and other features of several embodiments are now described with reference to the drawings. In the drawings, the same components have the same reference numerals. The illustrated embodiments are intended to illustrate but not limit the invention. The drawings include the following Figures.

DETAILED DESCRIPTION

Figure 1:
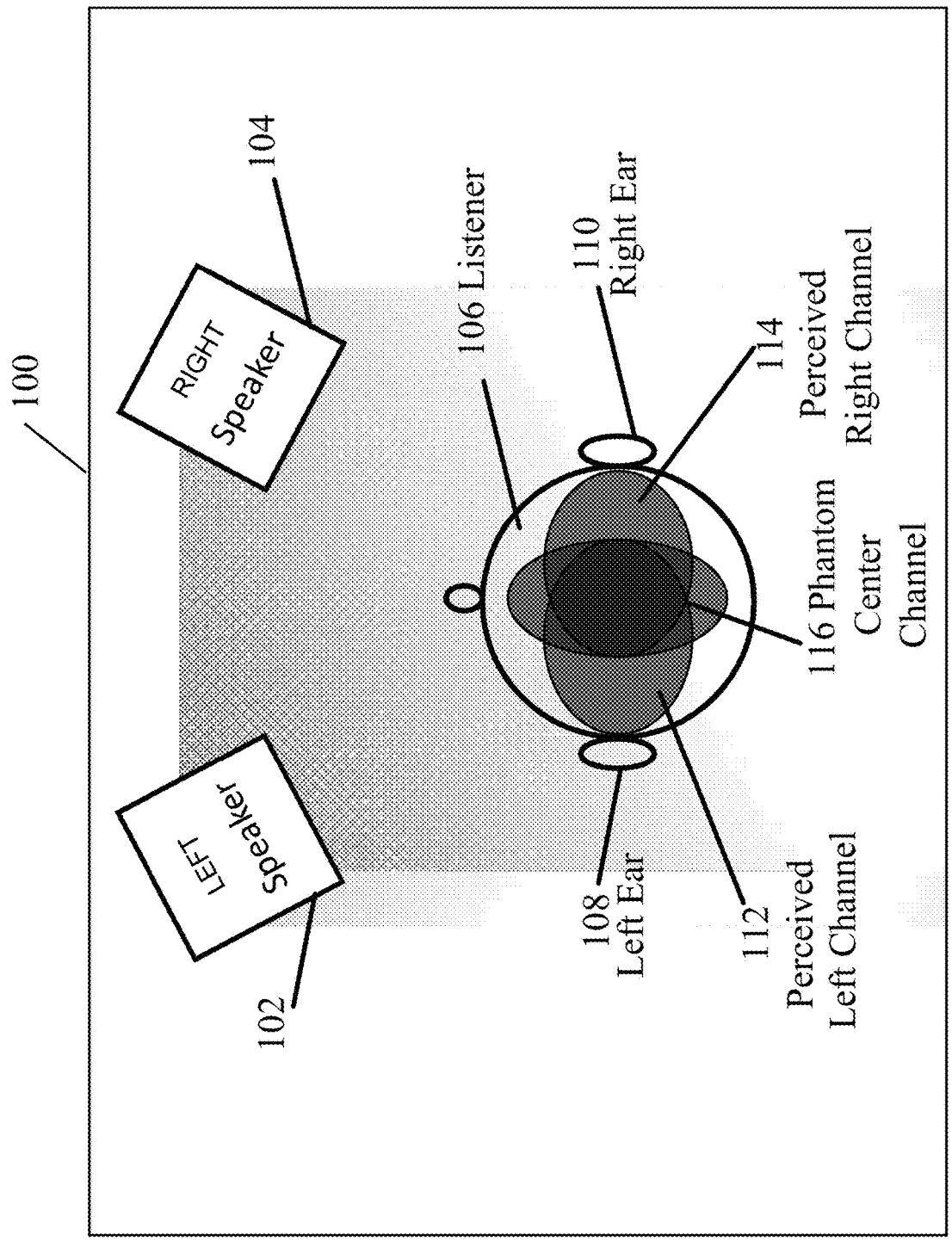
FIG. 1 shows an example listening environment, with left speaker and right speaker, according to an example of this disclosure.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose an audio reproduction device. Referring now to the drawings, where similar reference characters denote corresponding features consistently throughout the figures, various examples of this disclosure are described.

FIG. 1 shows an example listening environment 100 with left speaker 102 and right speaker 104, with a listener 106 selectively positioned to listen to the audio reproduced by the left speaker 102 and right speaker 104, through a combination of left ear 108 and right ear 110 of the listener 106. As one skilled in the art appreciates, the left ear 108 of the listener 106 primarily listens to audio reproduced by left speaker 102 and secondarily listens to the audio reproduced by the right speaker 104. Similarly, the right ear 110 of the listener 106 primarily listens to audio reproduced by right speaker 104 and secondarily listens to the audio reproduced by the left speaker 102. Left channel perceived by the listener 106 is depicted by the left shaded area 112. Right channel perceived by the listener 106 is depicted by the right shaded area 114. As one skilled in the art appreciates, the left shaded area 112 overlaps with the right shaded area 114. Further, a phantom center channel 116 is perceived by the listener 106.

Figure 2:
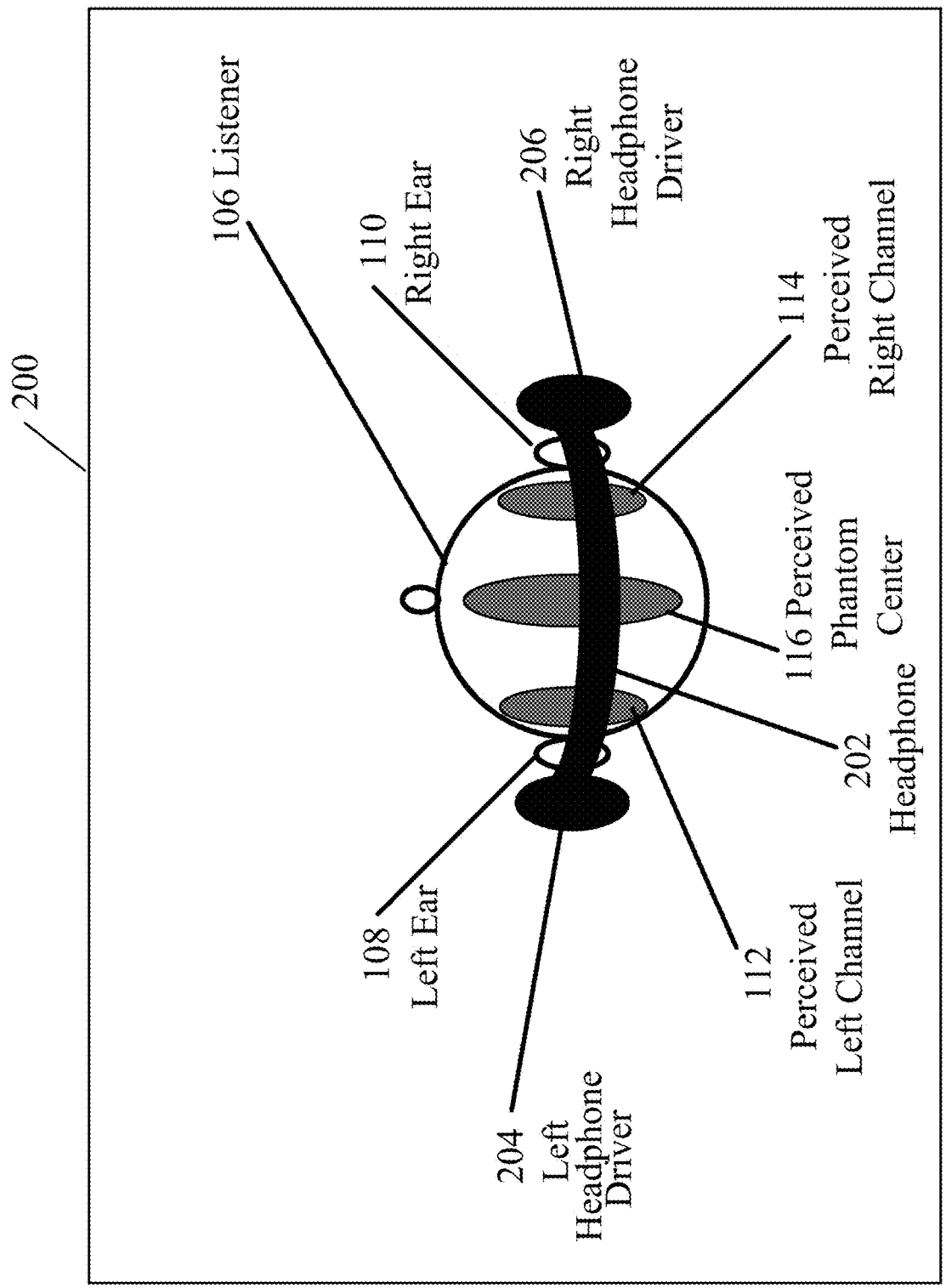
FIG. 2 shows another example listening environment, with left headphone driver and right headphone driver, according to an example of this disclosure.

FIG. 2 shows another example listening environment 200. In this listening environment 200, the listener 106 is using a headphone 202, with a left headphone driver 204 placed around, in or near the left ear 108 and a right headphone driver 206 placed around, in or near the right ear 110. The listener 106 selectively listens to the audio reproduced by the left headphone driver 204 through the left ear 108. The listener 106 also listens to the audio reproduced by the right headphone driver 206 through the right ear 110. Left channel perceived by the listener 106 is depicted by the left shaded area 112. Right channel perceived by the listener 106 is depicted by the right shaded area 114. As one skilled in the art appreciates, in this example, the left shaded area 112 does not overlap with the right shaded area 114. Further, a phantom center channel 116 is perceived by the listener 106. In this example, the phantom center channel 116 perceived by the listener 106 is narrower than as perceived in the example listening environment 100 described with reference to FIG. 1. In other words, the listener 106 in listening environment 200 experiences a materially different sound perception as compared to the listening environment 100. The consequences of this modified perception are broad. In some cases, the perceived locations of particular sounds are changed. In other cases, the lack of environmental effects such as indirect sounds resulting from reflective surfaces within a physical room or space are removed.

According to an example of this disclosure, real-time convolution to the digital sound signals are applied, with separate convolution functions for each incoming channel, and for each ear. For example, with a two-channel stereo signal, convolutions will be applied in real-time for the left channel to the left ear sometimes referred to as a LL convolution, left channel to the right ear, sometimes referred to as a LR convolution, right channel to the left ear, sometimes referred to as a RL convolution and right channel to the right ear, sometimes referred to as RR convolution.

In one example, each convolution function applies pre-calculated coefficients, associated with the impulse response data from a specific physical space. The number of coefficients for each convolution set can be calculated as follows: $n=s*t$, where n is the number of coefficients per convolution set, s is the sample rate of the digital signal source in samples per second, and t is the maximum convolution time in seconds. For example, with a signal sample rate of 64,000 samples per second and 0.25 seconds of maximum convolution time, n of 16,000 coefficients are required.

In one example, a non-linear bass distortion (NLBD) function generator is used to digitally generate a controlled harmonic distortion (sometimes referred to as CH distortion) associated with physical subwoofers. The digital NLBD function generator includes a low-pass filter to separate only low frequencies, circuit to generate even and/or odd harmonics, and another low-pass filter. The generated CH distortion is then mixed with the original signal.

In one example, a middle-side filter (MS filter) circuit is used to adjust the physical separation of the original sound source, which may be referred to as the perceived "sound stage". In the case of stereo signal, middle-side filter determines the perceived distance between the right and left virtual speakers within this sound stage. One implementation of a MS filter includes summing the signals from the left and right channels to create a "middle" signal. It also includes calculating the difference between the signals from the left and right channels to create a separate "side" signal. The middle channel then contains just the information that appears in both the left and right channels, and the side channel contains all the information that differs between the left and right channels. In other words, the middle signal represents sounds that would be perceived by a listener to be emanating mainly from a center location. Similarly, the side signal represents sounds that would be perceived by a listener to be emanating from either the left or right sides of the perceived sound stage. Therefore, by independently amplifying or attenuating the middle and side signals, it is possible to emphasize or reduce sound that appear to originate from either the center or the left and right sides of the perceived sound stage. Among other things, this has the effect of determining how far apart the virtual speakers are located within the perceived sound stage. After applying the amplification or attenuation of the middle and side signals, they are then subsequently summed together and divided by 2 to re-create the left signal, and subtracted from each and divided by 2 to recreate the right signal.

Given:
L=left signal
R=right signal
M=middle signal
S=side signal
MG=center gain; >1 represents amplification, 0<MG<1 represents attenuation
SG=side gain; >1 represents amplification, 0<SG<1 represents attenuation
Then:

$$M=MG*(L+R) \quad \text{Equation 1}$$

$$S=SG*(L-R) \quad \text{Equation 2}$$

Finally:

$$\text{Recreated Left Signal } L'=0.5*(M+S) \quad \text{Equation 3}$$

$$\text{Recreated Right Signal } R'=0.5*(M-S) \quad \text{Equation 4}$$

A combination of one or more of the convolution coefficients, CH distortion and MS filter may be applied to the original digital sound. Such a corrected digital sound may assist in recreating the perception of listening to sound as if it were being reproduced by loudspeakers in a defined (modeled) space. For example, the LL, LR, RL and RR convolutions emulate the sounds that would be received by the listener's ears within the modeled space. Instead of perceiving a narrow phantom center channel, the listener's brain reconstructs the processed left and right analog signals reproduced by the left and right headphone drivers into natural left and right channels and enables reconstruction of an accurate center channel.

To generate the required convolution coefficients, the desired (modeled) space must be evaluated. Now, referring to FIG. 3A and FIG. 3B desired space 300 is shown, with left speaker 302 and right speaker 304 positioned within the desired space 300.

A left ear microphone 306 and a right ear microphone 308 are selectively placed within the desired space 300, for example, at locations that may substantially correspond to a listener's left ear and right ear respectively.

Figure 3A:
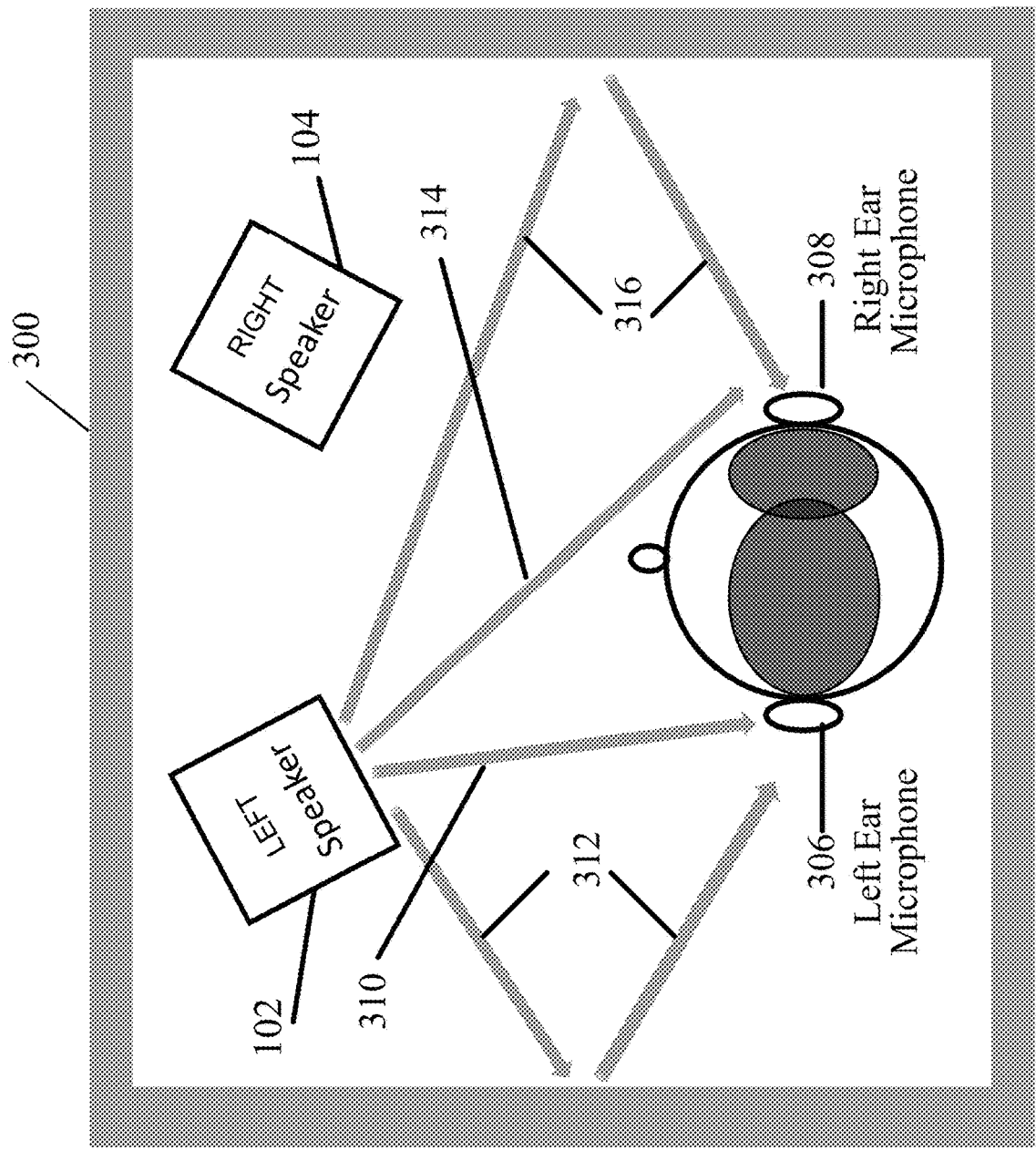
FIGS. 3A and 3B show desired space, with left speaker and right speaker positioned within the desired space, according to an example of this disclosure.

Now, referring to FIG. 3A, left speaker 302 is selectively energized with a known signal. Sound produced by the left speaker 302 is received by both the left ear microphone 306 and the right ear microphone 308. The sound received by the left ear microphone 306 includes a combination of direct signal (as shown by arrow 310) and reflected signals (as shown by arrow 312) off of the acoustically reflective surfaces of the desired space 300. The sound received by the right ear microphone 308 includes a combination of direct signal (as shown by arrow 314) and reflected signals (as shown by arrow 316) off of acoustically reflective surfaces of the desired space 300. As one skilled in the art appreciates, the reflected signal may be from a plurality of reflective surfaces, including walls, ceiling, floor, and other objects located within the desired three-dimensional space 300. Received signal by the left ear microphone 306 and right ear microphone 308 from the left speaker 302 are recorded and deconvolved.

For example, the signal received at the left ear microphone 306 from the left speaker 302 is deconvolved to generate the LL coefficients. The signal received at the right ear microphone 308 from the left speaker 302 is deconvolved to generate the LR coefficients.

Figure 3B:
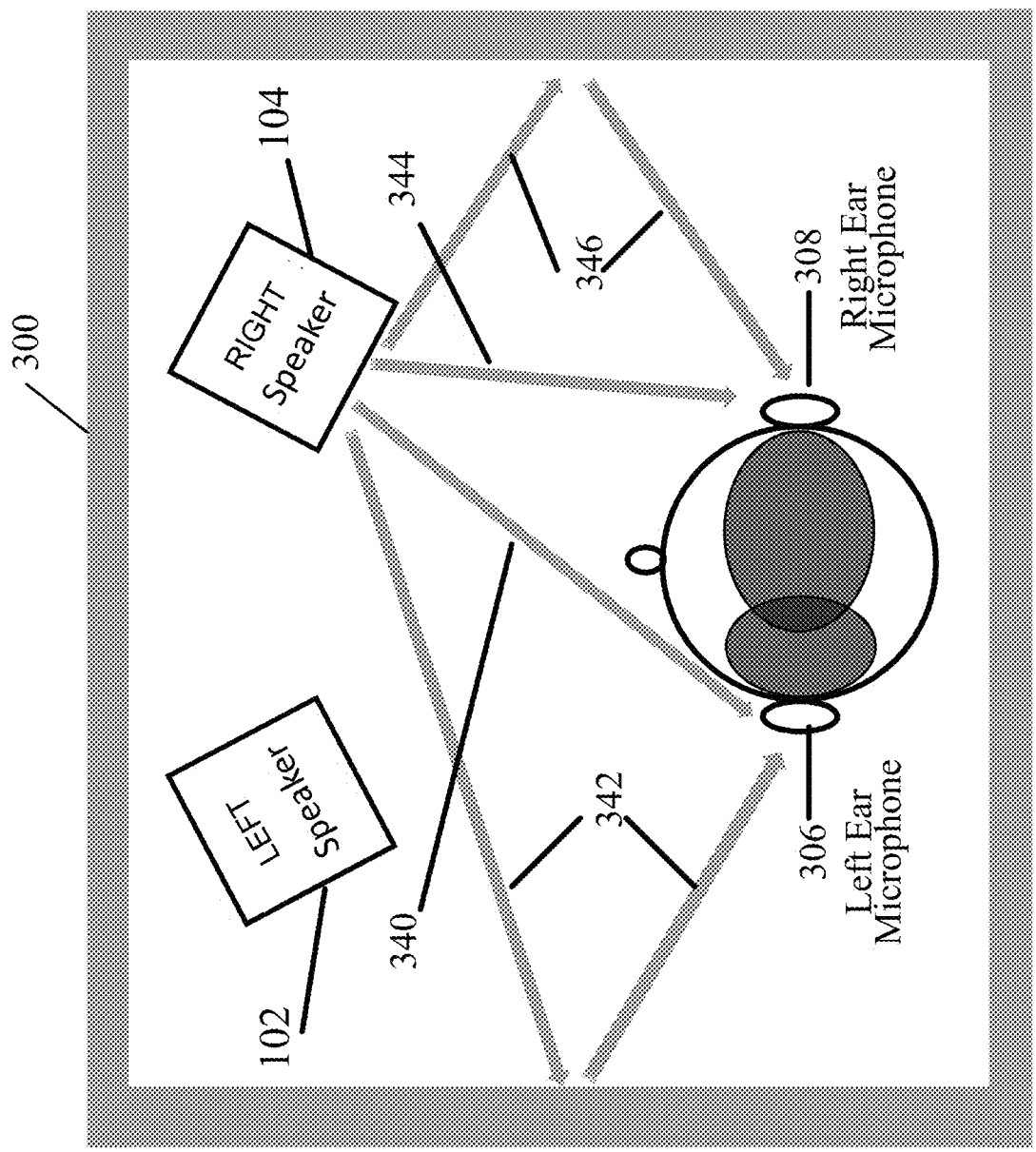
Figure 3C:
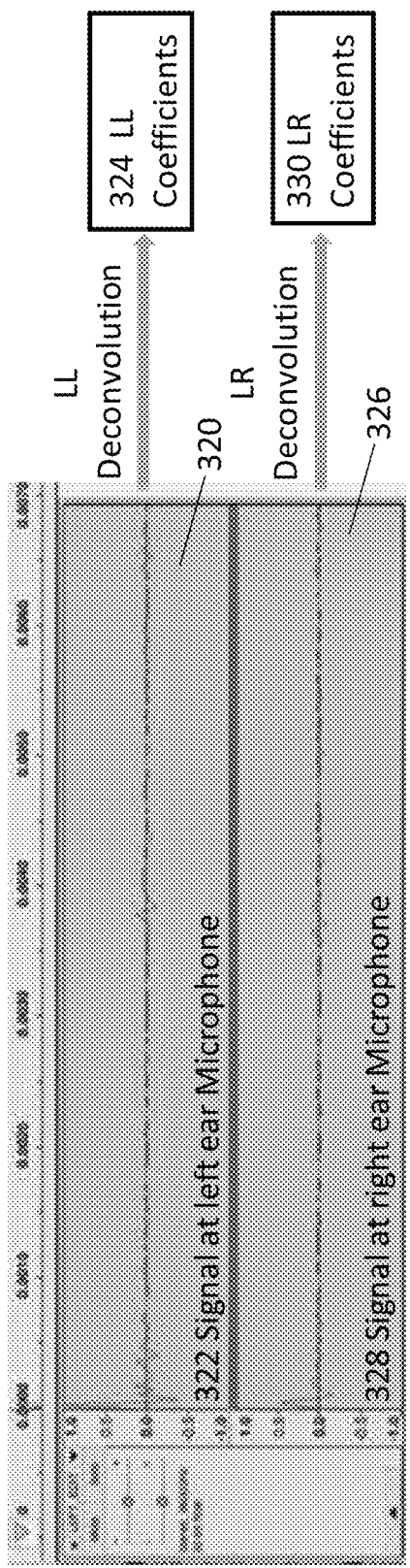
FIG. 3C shows a graph with signal measured at left ear microphone from the sound received from the left speaker and another graph with signal measured at right ear microphone from the sound received from the left speaker 302, according to an example of this disclosure.

Referring to FIG. 3C, graph 320 shows signal 322 measured at left ear microphone 306 from the sound received from the left speaker 302, which is deconvolved to generate LL coefficients 324. Graph 326 shows signal 328 measured at right ear microphone 308 from the sound received from the left speaker 302, which is deconvolved to generate the LR coefficients 330.

Now, referring to FIG. 3B, right speaker 304 is selectively energized with a known signal. Sound produced by the right speaker 304 is received by both the left ear microphone 306 and the right ear microphone 308. The sound received by the left ear microphone 306 includes a combination of direct signal (as shown by arrow 340) and reflected signal (as shown by arrow 342) off of the acoustically reflective surfaces of the desired space 300. The sound received by the right ear microphone 308 includes a combination of direct signal (as shown by arrow 344) and reflected signal (as shown by arrow 346) off of the acoustically reflective surfaces of the desired space 300. As one skilled in the art appreciates, the reflected signal may be from a plurality of reflective surfaces, including walls, ceiling, floor, and other objects located within the desired space 300. Received signal by the left ear microphone 306 and right ear microphone 308 from the right speaker 304 are recorded and deconvolved.

Figure 3D:
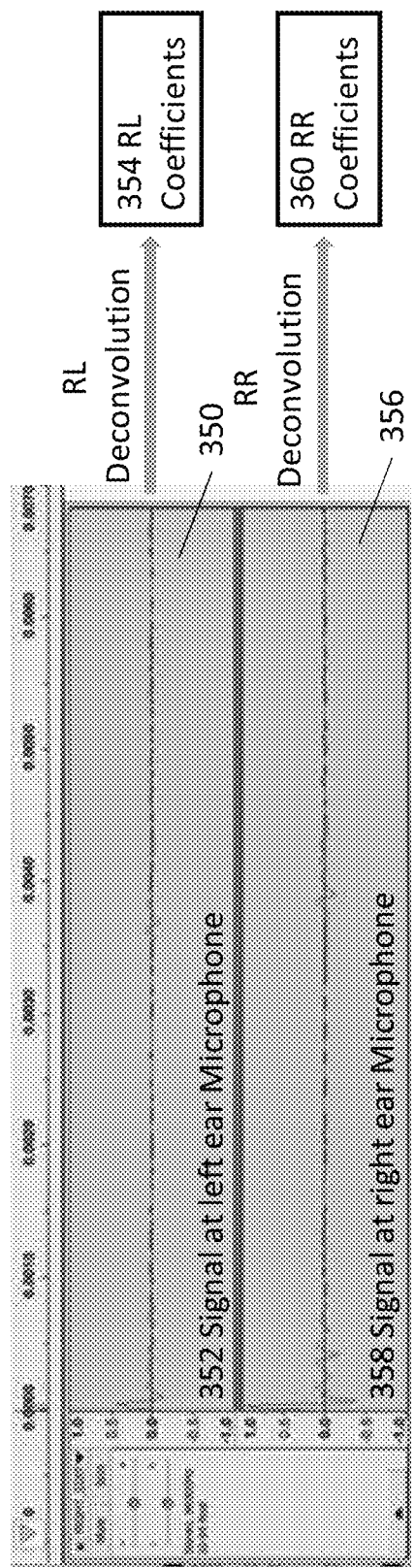
FIG. 3D shows a graph with signal measured at left ear microphone from the right speaker, and another graph with signal measured at right ear microphone from the sound received from the right speaker, according to an example of this disclosure.

For example, the signal received at the left ear microphone 306 from the sound received from the right speaker 304 is deconvolved to generate the RL coefficients. Referring to FIG. 3D, graph 350 shows signal 352 measured at left ear microphone 306 from the right speaker 304 which is deconvolved to generate RL coefficients 354. The signal received at the right ear microphone 308 from the sound received from the right speaker 304 is deconvolved to generate the RR coefficients. Graph 356 shows signal 358 measured at right ear microphone 308 from the sound received from the right speaker 304, which is deconvolved to generate the RR coefficients 360.

In one example, a digital signal processor may be configured to modify input signal based on the convolution coefficients measured for a modeled space. Now, referring to FIG. 4, an example audio system 400 is described. The audio system 400 includes a communication management engine 402, an analog input tuner 404, A/D (analog to digital)

converter 406, a digital signal processor (DSP) 408, a D/A (digital to analog) converter 410, an amplifier 412 and an analog output tuner 414.

The communication management engine 402 is configured to communicate with external devices, for example, computing device 416, over a wired connection 418 or a wireless connection 420. In one example, the communication management engine 402 is configured to communicate with the computing device 416 and receive various parameters for configuring the audio system 400, including the digital signal processor 408. In one example, the communication management engine 402 is configured to receive digital audio signal to be reproduced by the audio system 400, over the wired connection 418 or wireless connection 420. The received digital audio signal (for example, two channel digital audio signals L and R) is fed to the DSP 408.

The analog input tuner 404 is configured to communicate with an analog sound source 422, for example, over an analog wired connection 424, to receive audio signal to be reproduced by the audio system 400. In one example, a two-channel audio signal (left and right) is received. The analog input tuner 404 is configured to optimize impedance and frequency response characteristics of the analog audio signal received from the analog audio source 422. The output of the analog input tuner 404 is fed to the A/D converter 406, to generate digital audio signal (for example, two channel digital audio signals L and R). The digital audio signal is fed to the DSP 408.

The DSP 408 processes the received digital audio signal, applying modifications to the received digital audio signal, based on the convolution coefficients, generated CH distortion and the middle-side filter (MS filter) digital settings. Modified digital audio signal is then fed to the D/A converter 410 to generate modified analog audio signal. The modified analog audio signal in some examples may be amplified by the amplifier 412 to generate an amplified modified analog audio signal. The amplified modified analog audio signal is then fed to an analog output tuner 414. The analog output tuner 414 feeds the amplified modified analog audio signal to left driver 426 and right driver 428, for reproduction of the amplified modified analog audio signal. As one skilled in the art appreciates, if the amplifier 412 is not used, the modified analog audio signal will be fed to the analog output tuner 414 which in turn will feed the modified analog audio signal to the left driver 426 and the right driver 428, for reproduction of the modified analog audio signal. The analog output tuner 414 is configured to optimize impedance and frequency response characteristics of the modified analog audio signal for the left driver 426 and the right driver 428.

Having described the general operation of the audio system 400, functions and features of the DSP 408 will now be described. In general, the DSP 408 is configured to receive digital audio signal (for example, as L and R signals) from the A/D converter 406 (for audio received from an analog audio source) or the communication management engine 402 (for audio received from a digital audio source). The DSP 408 then selectively modifies the received digital audio signal to generate the modified digital audio signal and output the modified digital audio signal, to be fed to the D/A converter 410.

The DSP 408 includes a coefficients and parameters data store 430, a selected convolution coefficients data store 432, a selected DSP filter parameters data store 434, a LL convolution generator 436, a LR convolution generator 438, a RL convolution generator 440, a RR convolution generator 442, a CH distortion generator 444 and a middle-side filter circuit 446. The coefficients and parameters data store 430 stores various coefficients and parameters for one or more modeled space. In one example, various coefficients and parameters are received by the communication management engine 402, from an external computing device and loaded into the coefficients and parameters data store 430.

When a specific modeled space is selected, corresponding coefficients and parameters are retrieved from the coefficients and parameters data store 430 and selectively loaded into the selected convolution coefficients data store 432 and the selected DSP filter parameters data store 434. As one skilled in the art appreciates, the selected convolution coefficients data store 432 and the selected DSP filter parameters data store 434 may be configured to be high speed memory, so that data may be retrieved from them at a speed to process the data in real time.

The LL convolution generator 436, a LR convolution generator 438, a RL convolution generator 440, a RR convolution generator 442 selectively retrieve the selected convolution coefficients from the selected convolution coefficients data store 432 and apply appropriate convolution to each of the channels (L and R) of the digital audio signal to generate a convolved digital audio signal. The convolved digital audio signal is then fed to the D/A converter 410, to generate modified analog audio signal.

In one example, the CH distortion generator 444 adds CH distortion to the convolved digital audio signal. The middle-side filter circuit 446 based on the selected parameters, applies appropriate correction to the convolved digital audio signal with CH distortion, to generate the modified digital audio signal. The modified digital audio signal is then fed to the D/A converter 410, to generate modified analog audio signal.

As previously described, the modified analog audio signal in some examples may be amplified by the amplifier 412 to generate an amplified modified analog audio signal. The amplified modified analog audio signal is then fed to an analog output tuner 414. The analog output tuner 414 feeds the amplified modified analog audio signal to left driver 426 and right driver 428, for reproduction of the amplified modified analog audio signal. As one skilled in the art appreciates, if the amplifier 412 is not used, the modified analog audio signal will be fed to the analog output tuner 414 which in turn will feed the modified analog audio signal to the left driver 426 and the right driver 428, for reproduction of the modified analog audio signal. The analog output tuner 414 is configured to optimize impedance and frequency response characteristics of the modified analog audio signal for the left driver 426 and the right driver 428. Functions and features of the analog output tuner 414 will be further described with reference to FIGS. 4A and 4B.

Figure 4:
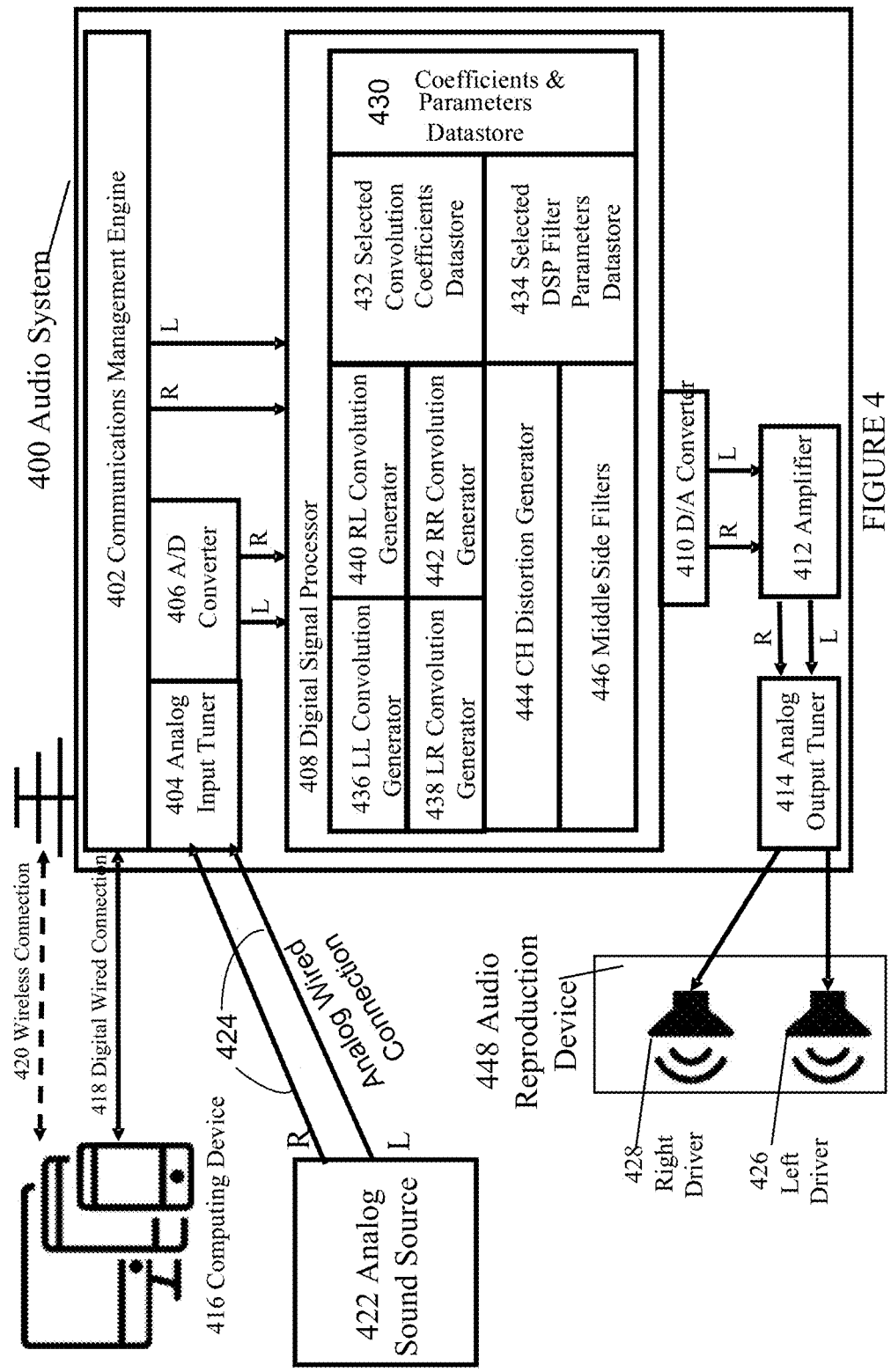
FIG. 4 shows an example audio system, according to an example of this disclosure.
Figure 4A:
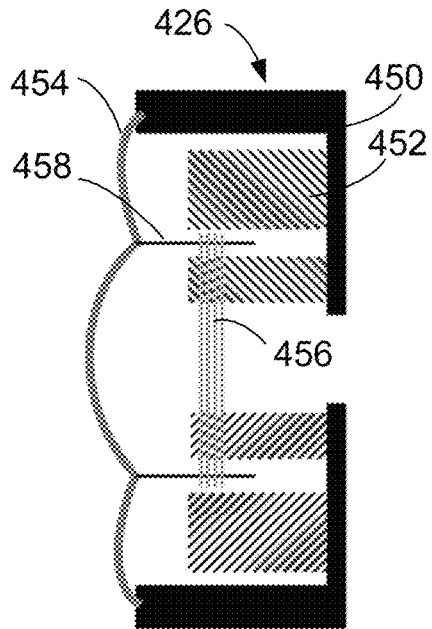
FIG. 4A shows an example audio reproduction device, according to an example of this disclosure.

Now, referring to FIG. 4A, a portion of the audio reproduction device 448, for example, left driver 426 is shown. The left driver 426 includes an enclosure 450, a magnet assembly 452, a diaphragm 454, and a coil 456 selectively wound on a bobbin 458 selectively attached to the diaphragm 454. As one skilled in the art appreciates, when the coil 456 is selectively energized with the modified analog audio signal, the diaphragm 454 vibrates, reproducing the sound indicative of the modified analog audio signal.

In order to create an accurate perception of listening in an environment emulated by the digital signal processor 408, the audio reproduction device 448 is configured to quickly respond to sudden changes, or transients in the electrical signal represented by the modified audio signal. To achieve such a rapid transient response, in some examples, the diaphragm 454 may include a metallic material. Preferably, such a metallic material be of light weight. For example, the metallic material may include Beryllium, Titanium, or a carbon based material such as Graphene. Often, these high performance diaphragm materials result in an increased high frequency response that may sound harsh or displeasing for a listener. In some examples, the right driver 428 may be constructed similar to the left driver 426. In one example, the analog output tuner 414 is configured to shape the frequency response curve to help minimize these harsh listening effects.

Figure 4C:
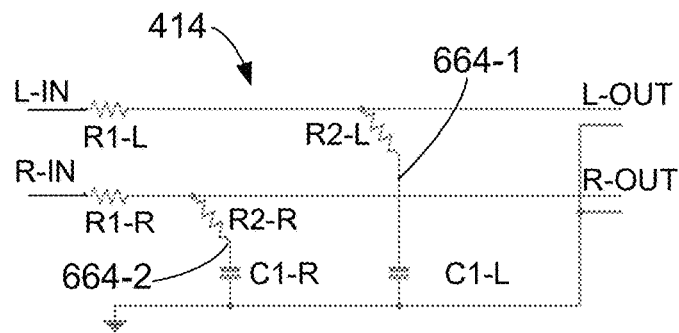
FIG. 4C shows an example construction of the analog output tuner, according to an example of this disclosure.
Figure 4D:
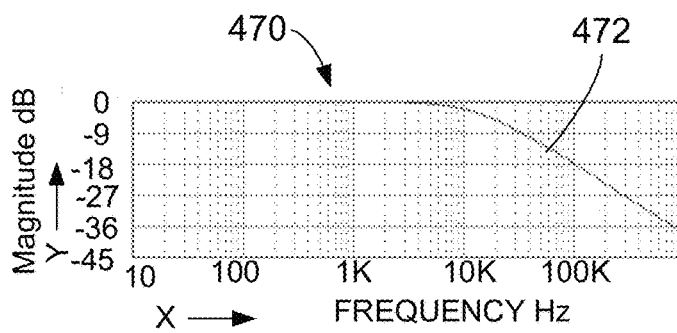
FIG. 4D shows an example frequency response curve of the analog output tuner of FIG. 4C, according to an example of this disclosure.
Figure 4B:
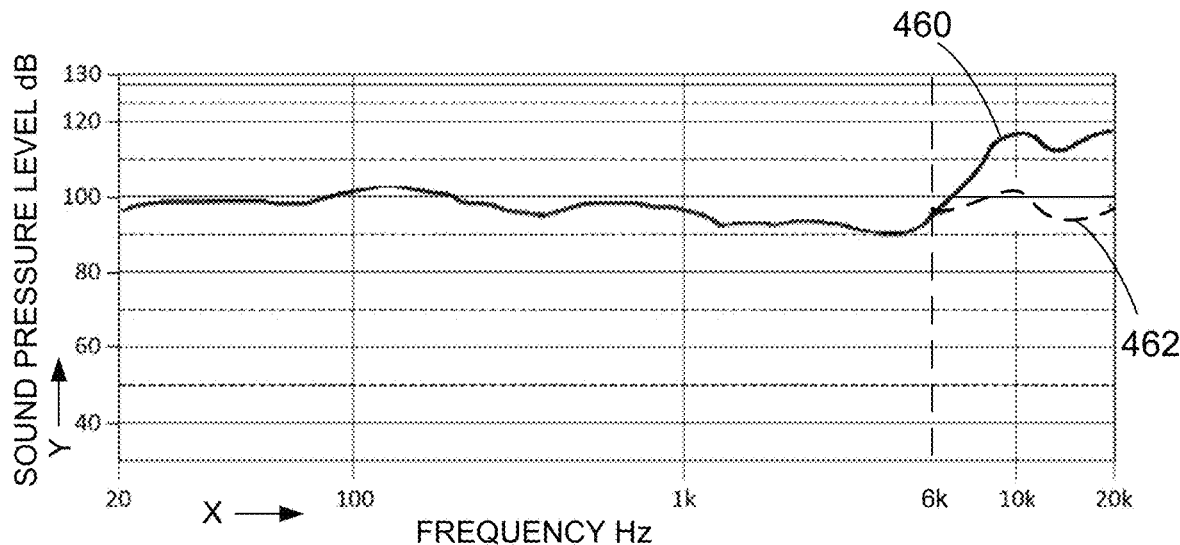
FIG. 4B shows an example sound pressure graph, according to an example of this disclosure.

Now, referring to FIG. 4B, an example sound pressure graph of the left driver 426 is shown. X-axis shows frequency in Hz and Y-axis shows sound pressure level in dB. Graph 460 shows the sound pressure level for the left driver 426, without effects of the analog output tuner 414. In some examples, it is desirable to maintain the sound pressure level around 100 dB. As one skilled in the art appreciates, the sound pressure level of the graph 460 is substantially around 100 dB, for frequencies below 6 KHz, and starts to spike after about 6 KHz frequency. In one example, the analog output tuner 414 selectively attenuates the signal above about 6 KHz, to maintain the sound pressure level around 100 dB. For example, portion of the graph 462 shows the effect of the analog output tuner 414.

Referring now to FIG. 4C, an example implementation of the analog output tuner 414 will be described. The analog output tuner 414 receives output of the amplifier 412, as input signal and provides an output signal. For example, the analog output tuner 414 receives left signal L-IN and right signal R-IN as input from the amplifier 412 and provides left output L-OUT and right output R-OUT. For each of the left channel and right channel, the analog output tuner 414 includes one input resistor (for example, R1-L and R1-R) coupled between the input and the output. The input resistors R1-L and R1-R are each shunted by a filter circuit at the output. The filter circuit includes a filter resistor coupled in series to a filter capacitor. The filter circuit 664-1 for left channel includes a filter resistor R2-L and a filter capacitor C1-L connected in series. The filter circuit 664-2 for right channel includes a filter resistor R2-R and a filter capacitor C1-R connected in series. The values of the input resistor, filter resistor, and filter capacitor are so chosen as to attenuate the received input signal beyond a certain selected frequency. In one example, the value of the input resistor R1-L and R1-R is selected to be about 5.6 Ohms. The resistance value of the filter resistors R2-L and R2-R is selected to be about 5.1 Ohms. The capacitance value of the filter capacitors C1-L and C1-R is selected to be about 2.2 microfarad. In one example, the input signal is attenuated above a frequency of about 6 KHz. The output L-OUT of the analog output tuner 414 is fed to the left driver 426. The output R-OUT of the analog output tuner 414 is fed to the right driver 428.

Now, referring to FIG. 4D, an example graph 470 with a magnitude plot 472 of the output of the analog output tuner 414 is shown. In some examples, the magnitude plot graph may be referred to as a Bode magnitude Plot for the filter circuit. The X-axis of the graph 470 shows frequency in Hz, on a log scale. The Y-axis of the graph 470 shows magnitude in dB. For example, referring to the magnitude plot 472, we notice that there is no appreciable attenuation in the output until a frequency of about 6 KHz. Thereafter, the filter circuit attenuates the input signal.

In one example, the audio system 400 may be selectively placed within an enclosure of an audio reproduction device 448. The audio reproduction device 448 may be a headphone with the left driver 426 and the right driver 428. Additionally, any power source needed to operate the audio system 400 may also be selectively placed within the enclosure of the audio reproduction device 448.

Figure 5:
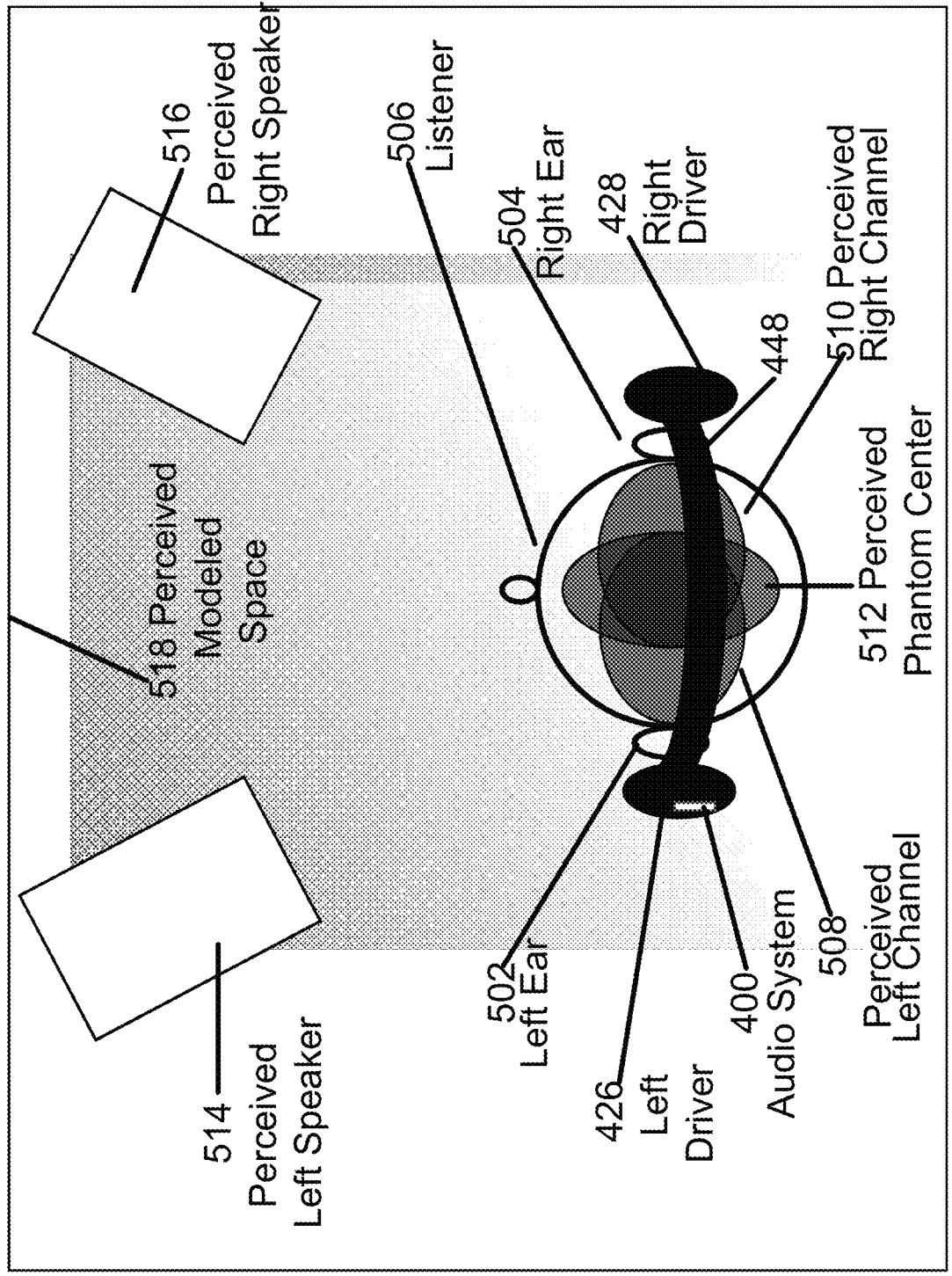
FIG. 5. shows an audio reproduction device placed within the audio system of FIG. 4, according to an example of this disclosure.

Now, referring to FIG. 5, audio reproduction device 448, with left driver 426 and right driver 428 is shown. In this example, the audio system 400 is selectively placed within the audio reproduction device 448, for example, within the enclosure surrounding the left driver 426. The audio reproduction device 448 is selectively placed relative to the left ear 502 and right ear 504 of a listener 506. The modified analog audio signal is reproduced by the left driver 426 and the right driver 428, with an overlapping perceived left channel 508, perceived right channel 510, and a perceived phantom center channel 512. In one example, the listener 506 will have a perception that the sound is emanating from a perceived left loudspeaker 514 and perceived right loudspeaker 516, selectively placed within the modeled space 518 from which convolution coefficients were derived.

Figure 6:
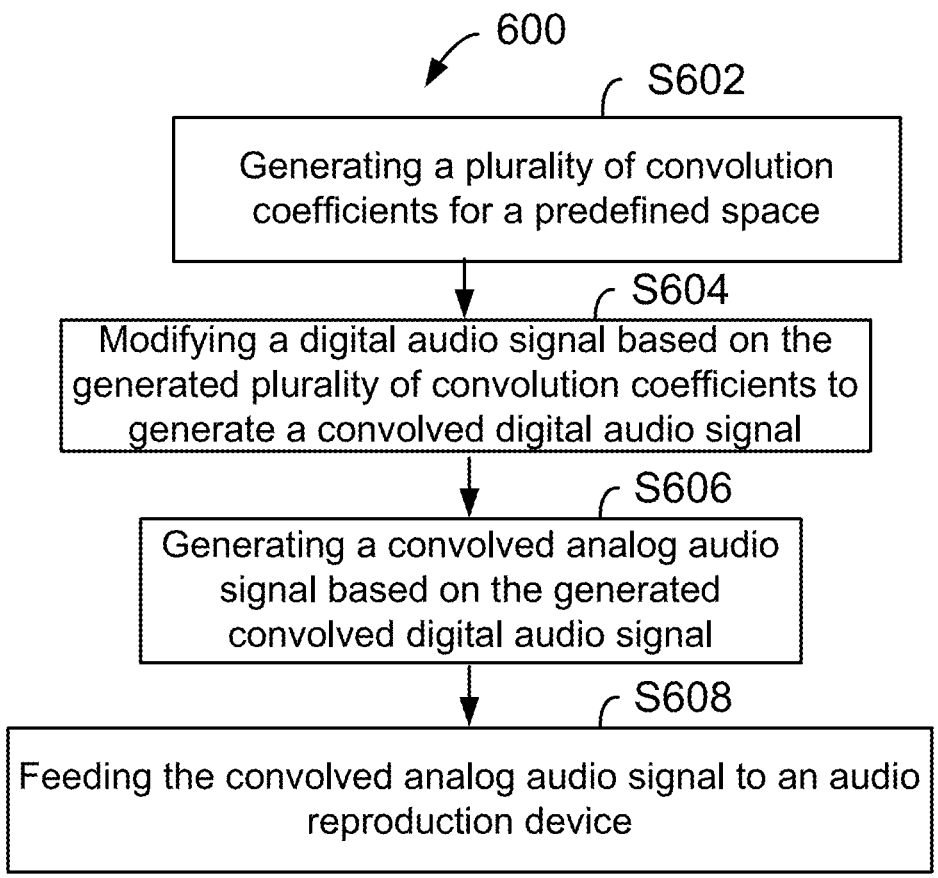
FIG. 6 shows an example flow diagram, according to an example of this disclosure.

Now, referring to FIG. 6, an example flow diagram 600 is described. In block S602, a plurality of convolution coefficients for a predefined space is generated. For example, as previously described, LL convolution coefficient, LR convolution coefficient, RL convolution coefficient and RR convolution coefficient for a predefined space is generated, as previously described.

In block S604, a digital audio signal is modified based on the generated plurality of convolution coefficients, to generate a convolved digital audio signal. For example, as previously described with reference to FIG. 4, an audio system 400 may be configured to modify a digital audio signal, based on the generated plurality of convolution coefficients, to generate a convolved digital audio signal. In some examples, the convolved digital audio signal may be further modified by adding a CH distortion. In some examples, the convolved digital audio signal may be further modified by a middle-side filter circuit, based on selected parameters.

In block S606, a convolved analog audio signal is generated based on the generated convolved digital audio signal. For example, as previously described with reference to FIG. 4, an audio system 400 may be configured to generate the convolved analog audio signal based on the generated convolved digital audio signal. For example, the D/A converter 410 may be conveniently configured to generate the convolved analog audio signal based on the generated convolved digital audio signal. In some examples, the convolved digital audio signal further modified by adding CH distortion and middle-side filter circuit, referred to as modified digital audio signal may be fed to the D/A converter 410 to generate the convolved analog audio signal based on the generated modified digital audio signal.

In block S608, the generated convolved analog audio signal is fed to an audio reproduction device. For example, generated convolved analog audio signal is fed to the audio reproduction device 448, as previously described.

The process of convolution requires significant signal processing, while not introducing perceivable delays, or latency. Typically, such processing involves multiple finite impulse response (FIR) filters, where the impulse response characteristics can be of significant duration, generally, greater than 100 milliseconds, and the processing capacity necessary to compute the FIR function may require significant energy.

One approach to implement a FIR filter is to calculate the convolution in the frequency domain, and in real time. However, with long impulse response characteristics, such an implementation can introduce unacceptable delays into the audio stream and potentially consume an unacceptable amount of electrical energy.

An alternate solution that allows reaching the low latency and low energy requirements is a partitioned convolution algorithm. Partitioning the algorithm enables splitting both the audio and the impulse response characteristics into smaller sub-components and processing them separately in the frequency domain. Then, combined result is then merged into the final signal in the time domain.

Figure 7A:
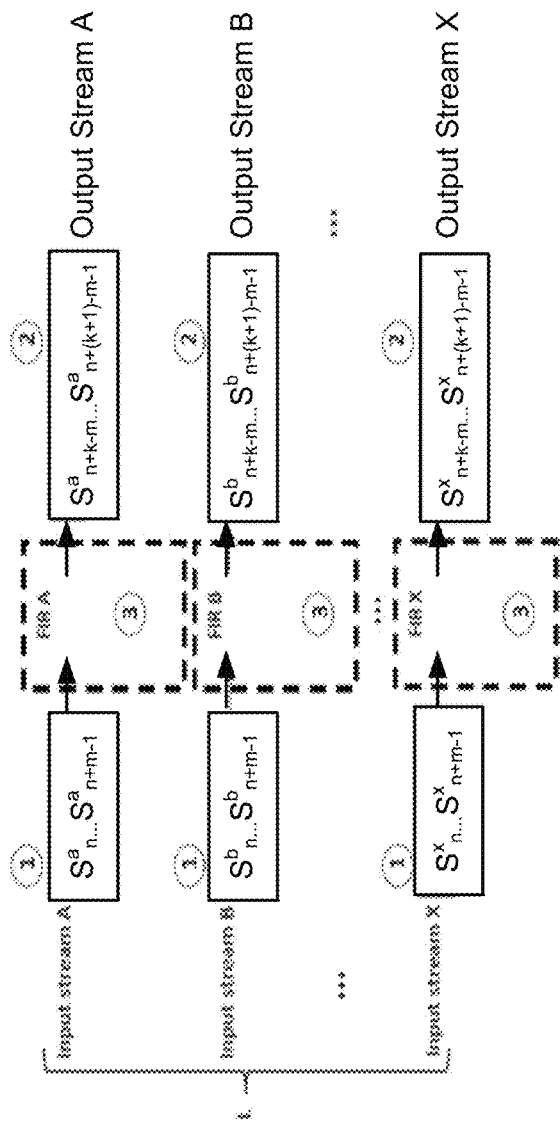
FIG. 7A shows an example processing of multiple input streams, according to an example of this disclosure.

Now, referring to FIG. 7A, an example processing of each input stream separately is described. FIG. 7A shows a plurality of input streams, for example, input stream A, input stream B and so on, to input stream X. Each of the input stream is processed by a corresponding FIR filter. For example, input stream A is processed by FIR A to provide output stream A, input stream B is processed by FIR B to provide output stream B, and input stream X is processed by FIR X to provide output stream X.

An alternate solution that allows reaching the low latency requirement is a partitioned convolution algorithm. Partitioning the algorithm enables splitting both the audio and the impulse response characteristics into smaller sub-components and processing them separately in the frequency domain. Then, the combined result is then merged into the final signal in the time domain.

The use of a partitioned convolution algorithm implies a significant tradeoff between the size of each partition and the required processing time. Reducing partition size results in less latency but requires more processing effort, therefore consuming more energy. However, the increased processing demands can become impractical due to the hardware limitations such as available processing speed or power consumption, particularly in mobile or wearable devices. An improvement to the partitioned convolution algorithm that reduces the need in the processing time and energy is desirable.

Figure 7B:
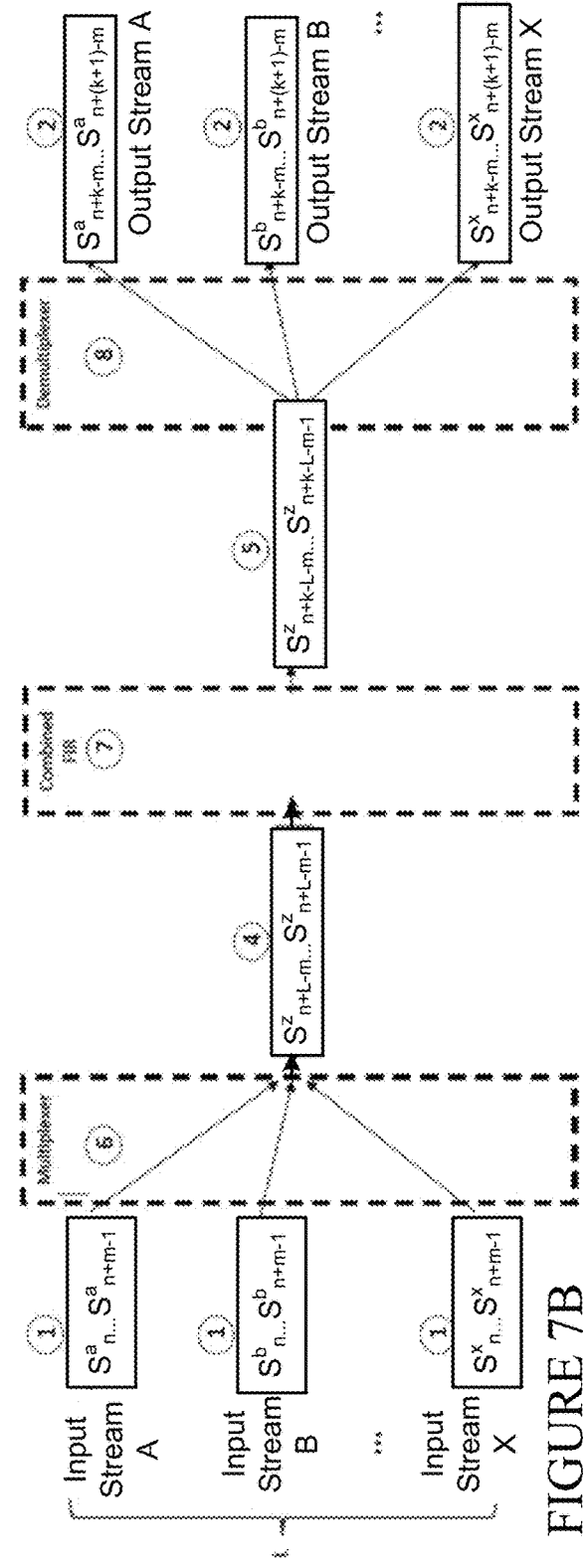
FIG. 7B shows an alternate example processing of multiple input streams, according to an example of this disclosure.

In accordance with an example of this disclosure, an alternate example of processing the input streams is described with reference to FIG. 7B. In this example, the input streams are multiplexed by a multiplexer to generate a multiplexed stream of input stream. For example, input stream A, input stream B, and input stream X are multiplexed by the multiplexer to generate a multiplexed input stream. The multiplexed input stream is then processed by a combined FIR filter to generate a multiplexed output stream. The multiplexed output stream is then processed by a de-multiplexer to generate corresponding output stream A, output stream B and output stream X.

As one skilled in the art appreciates, spatial emulation of audio signals requires two or more FIRs processed simultaneously and the system described herein above with reference to FIG. 7B may be advantageously used to process multiple streams of audio signals.

Figure 7C:
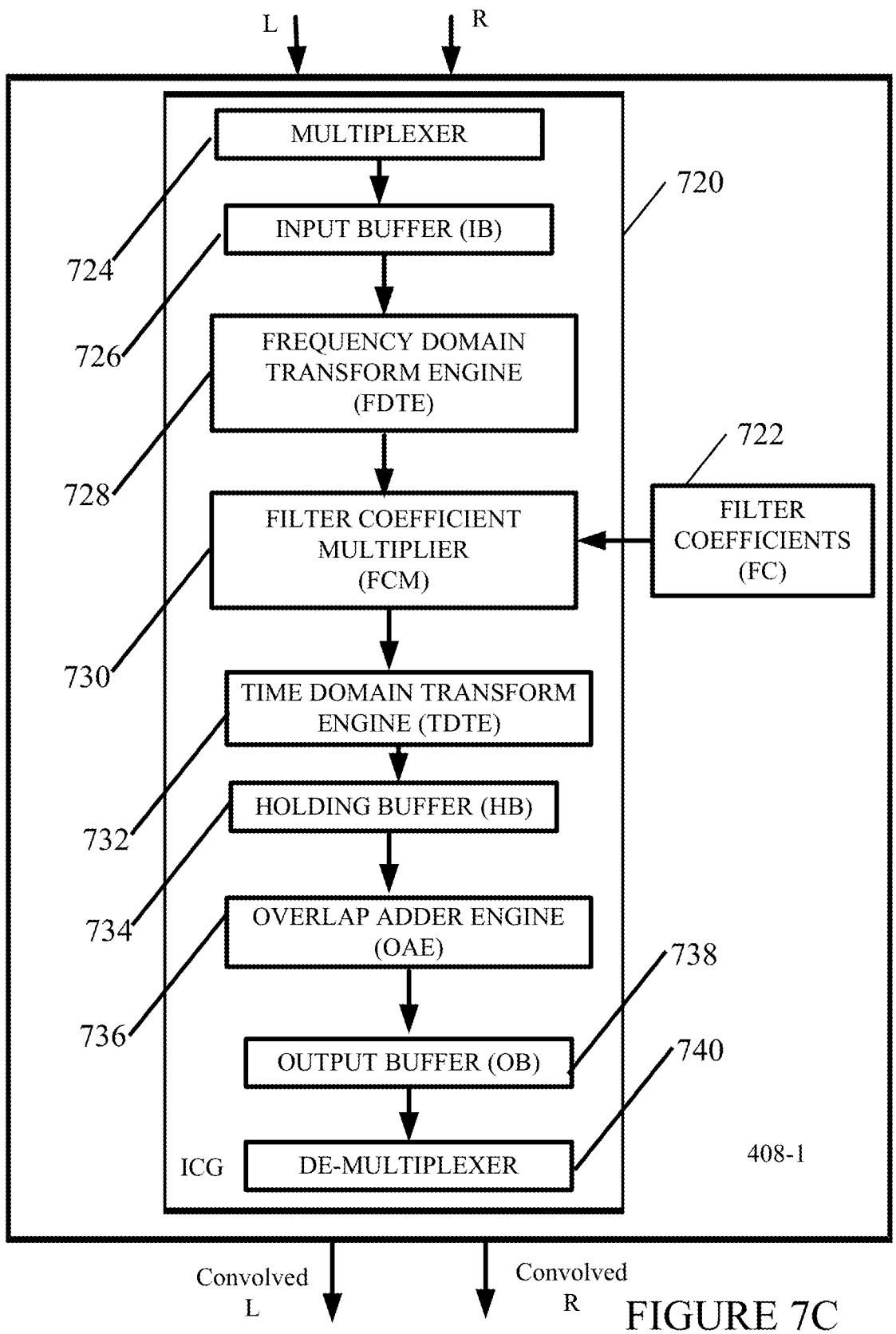
FIG. 7C shows an example digital signal processor, according to an example of this disclosure.

Now, referring to FIG. 7C, another example digital signal processor 408-1 is shown. Digital signal processor 408-1 may be similar to the digital signal processor 408, previously described with reference to FIG. 4, however, only elements associated with generating a convolved digital audio signal are described with reference to FIG. 7C. For example, the integrated convolution generator (ICG) 720 of digital signal processor 408-1 may replace LL convolution generator 436, LR convolution generator 438, RL convolution generator 440 and RR convolution generator 442 of digital signal processor 408 described with reference to FIG. 4. Further, filter coefficients (FC) data store 722 may correspond to selected convolution coefficients datastore 432 described with reference to FIG. 4.

ICG 720 includes a multiplexer 724, input buffer (IB) 726, frequency domain transform engine (FDTE) 728, filter coefficient multiplier (FCM) 730, time domain transform engine (TDTE) 732, holding buffer (HB) 734, overlap adder engine (OAE) 736, output buffer (OB) 738 and de-multiplexer 740.

Multiplexer 724 is configured to receive samples of input audio signals from a plurality of channels. For example, multiplexer 724 may receive a plurality of samples of two channel digital audio signals (L and R). In one example, the received plurality of samples of two channel digital audio signals are multiplexed by the multiplexer 724 and selectively stored in the input buffer 726 so as to be processed together by the FDTE 728.

FDTE 728 converts the received two channel digital audio signals into frequency domain. The FCM 730 selectively multiplies the converted two channel digital audio signals in frequency domain, with corresponding filter coefficients. Output of the FCM 730 is fed to the TDTE 732, which converts the two channel digital audio signals to time domain. Output of the TDTE 732 is stored in a holding buffer 734. Holding buffer 734 is configured to hold output of the TDTE 732 for multiple time periods. Selective output of the TDTE 732 is fed from the holding buffer 734 to the OAE 736.

The OAE 736 selectively adds various samples of the output of the TDTE 732 to generate a combined convolved digital audio signal for both channels. The output of the OAE 736 is stored in the output buffer 738. The de-multiplexer 740 selectively separates the combined convolved digital audio signal into separate convolved digital audio signal, for example, convolved digital audio signal for L channel and convolved digital audio signal for R channel. Convolved digital audio signal for L channel and convolved digital audio signal for R channel may be further processed as previously described with reference to digital signal processor 408, with reference to FIG. 4.

Figure 7D:
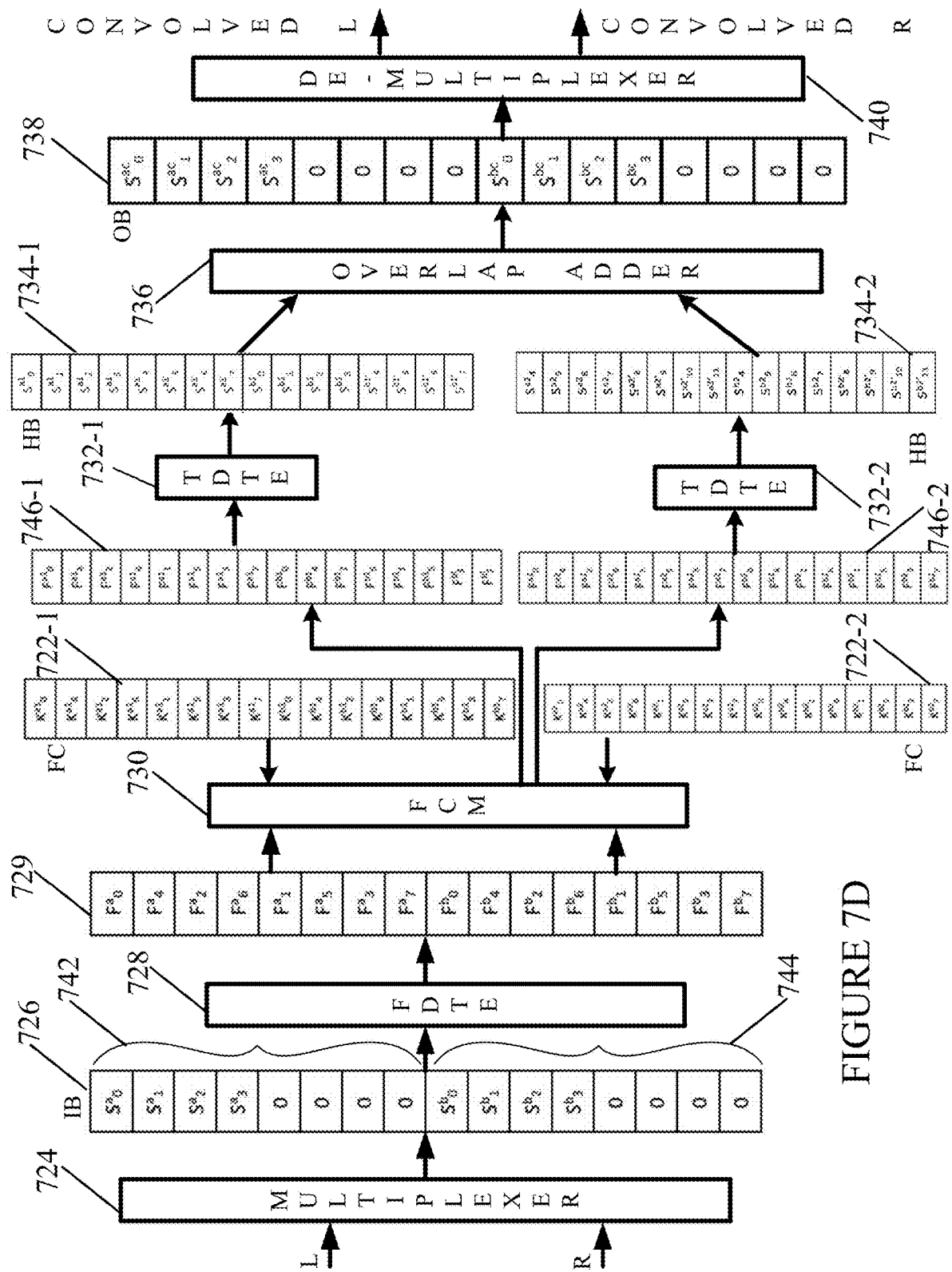
FIG. 7D shows an example processing of various samples of input stream of data by the digital signal processor of FIG. 7B, according to an example of this disclosure.

Now, referring to FIG. 7D, an example processing of various samples of input stream of data by the digital signal processor 408-1 is described. In this example, two-channel audio data signal (for example, L channel audio and R channel audio data signal) is processed simultaneously. Multiplexer 724 receives two-channel audio data signal. In this example, four samples of data for each channel are processed simultaneously for a given time period. And, two successive subsets of four samples of data provides data related to both short echo and long echo, to generate the convolved digital audio signal for L channel and convolved digital audio signal for R channel. Two successive subsets of four samples of data for L channel are represented as $S^a_0$, $S^a_1$, $S^a_2$, and $S^a_3$ at time t−1 and as $S^a_4$, $S^a_5$, $S^a_6$, and $S^a_7$ at time t. Two successive subsets of four samples of data for R channel are represented as $S^b_0$, $S^b_1$, $S^b_2$, and $S^b_3$ at time t−1 and as $S^b_4$, $S^b_5$, $S^b_6$, and S at time t.

The input buffer 726 has a first portion 742, configured to receive samples of L channel and a second portion 744, configured to receive samples of R channel. In this example, each of the first portion 742 and the second portion 744 of the input buffer 726 have eight buffers and are configured to hold eight samples of audio signals for each channel (L and R). According to an example of this disclosure, multiplexer 724 loads four samples of the L channel (shown as $S^a_0$, $S^a_1$, $S^a_2$, and $S^a_3$) into only first four of the available eight buffers of the first portion 742 and loads zeros in the second four of the available eight buffers of the first portion 742 for L channel. Similarly, the multiplexer 724 loads four samples of the R channel (shown as $S^b_0$, $S^b_1$, $S^b_2$, and $S^b_3$) into only first four of the available eight buffers of the second portion 744 and loads zeros in the second four of the available eight buffers of the second portion 744 for R channel. This selective partial loading of the samples in the input buffer 726 advantageously keeps the processed data separated by each L channel and R channel, when the FDTE 728 processes the samples of audio signals of L channel and R channel.

In general, samples x for each channel may chosen as $x=2^p$, where p is an integer and number of buffers in each of the first portion 742 and second portion 744 will be $2 \times 2^p$, so that there will be equal number of samples and zeroes in the first portion 742 and second portion 744. In this example, p=2, number of samples will be $x=2^2=4$ and number of buffers in the first portion 742 and second portion 744 is $2 \times 2^2 = 2 \times 4 = 8$. And, the first four buffers in each of the first portion 742 and second portion 744 are filled with samples and the remaining four buffers in each of the first portion 742 and second portion 744 are filled with zeroes.

The samples of the first portion 742 are processed by the FDTE 728 and the samples are transformed into frequency domain components (shown as $F^a_0$, $F^a_1$, $F^a_2$, $F^a_3$, $F^a_4$, $F^a_5$, $F^a_6$, and $F^a_7$) for channel L and shown in FDTE output 729. Similarly, samples of the second portion 744 are processed by the FDTE 728 and the samples are transformed into frequency domain components (shown as $F^b_0$, $F^b_1$, $F^b_2$, $F^b_3$, $F^b_4$, $F^b_5$, $F^b_6$, and $F^b_7$) for channel R and shown in FDTE output 729. Differences between a traditional 16 input FFT and FDTE 728 of this disclosure will be further described with reference to FIGS. 8A and 8B.

Next, there are two sets of filter coefficients, one for short echo and another for long echo. The first filter coefficient 722-1 corresponds to short echo and the second filter coefficient 722-2 corresponds to long echo. For example, the first filter coefficients 722-1 include coefficients $K^{a1}_0$, $K^{a1}_1$, $K^{a1}_2$, $K^{a1}_3$, $K^{a1}_4$, $K^{a1}_5$, $K^{a1}_6$, and $K^{a1}_7$, corresponding to channel L presented in the frequency domain. Each of these filter coefficients is multiplied with corresponding frequency domain components $F^a_0$, $F^a_1$, $F^a_2$, $F^a_3$, $F^a_4$, $F^a_5$, $F^a_6$, and $F^a_7$ by the FCM 730, to yield an output of $F^{a1}_0$, $F^{a1}_1$, $F^{a1}_2$, $F^{a1}_3$, $F^{a1}_4$, $F^{a1}_5$, $F^{a1}_6$, and $F^{a1}_7$ respectively, for channel L. For example, $Fa_0$ is multiplied with $K^{a1}_0$ to yield an output of $F^{a1}_0$. The output is still represented in frequency domain. The output includes effect of short echo for channel L. These outputs may be referred to as frequency domain components with short echo effect for channel L.

The first filter coefficients 722-1 also include coefficients $K^{b1}_0$, $K^{b1}_1$, $K^{b1}_2$, $K^{b1}_3$, $K^{b1}_4$, $K^{b1}_5$, $K^{b1}_6$, and $K^{b1}_7$, corresponding to channel R presented in the frequency domain. Each of these filter coefficients are multiplied with corresponding frequency domain components $F^b_0$, $F^b_1$, $F^b_2$, $F^b_3$, $F^b_4$, $F^b_5$, $F^b_6$, and $F^b_7$ by the FCM 730, to yield an output of $F^{b1}_0$, $F^{b1}_1$, $F^{b1}_2$, $F^{b1}_3$, $F^{b1}_4$, $F^{b1}_5$, $F^{b1}_6$, and $F^{b1}_7$ respectively, for channel R. For example, $Fb_0$ is multiplied with $K^{b1}_0$ to yield an output of $F^{b1}_0$. The output is still represented in frequency domain. The output includes effect of short echo for channel R. These outputs may be referred to as frequency domain components with short echo effect for channel R.

The second filter coefficients 722-2 include coefficients $K^{a2}_0$, $K^{a2}_1$, $K^{a2}_3$, $K^{a2}_4$, $K^{a2}_5$, $K^{a2}_6$, and $K^{a2}_7$, corresponding to channel L presented in the frequency domain. Each of these filter coefficients are multiplied with corresponding frequency domain components $F^a_0$, $F^a_1$, $F^a_2$, $F^a_3$, $F^a_4$, $F^a_5$, $F^a_6$, and $F^a_7$ by the FCM 730, to yield an output of $F^{a2}_0$, $F^{a2}_1$, $F^{a2}_2$, $F^{a2}_3$, $F^{a2}_4$, $F^{a2}_5$, $F^{a2}_6$, and $F^{a2}_7$ respectively, for channel L. For example, $Fa_0$ is multiplied with $K^{a2}_0$ to yield an output of $F^{a2}_0$. The output is still represented in frequency domain. The output includes effect of long echo for channel L. These outputs may be referred to as frequency domain components with long echo effect for channel L.

The second filter coefficients 722-2 also include coefficients $K^{b2}_0$, $K^{b2}_1$, $K^{b2}_2$, $K^{b2}_3$, $K^{b2}_4$, $K^{b2}_5$, $K^{b2}_6$, and $K^{b2}_7$, corresponding to channel R presented in the frequency domain. Each of these filter coefficients are multiplied with corresponding frequency domain components $F^b_0$, $F^b_1$, $F^b_2$, $F^b_3$, $F^b_4$, $F^b_5$, $F^b_6$, and $F^b_7$ by the FCM 730, to yield an output of $F^{b2}_0$, $F^{b2}_1$, $F^{b2}_2$, $F^{b2}_3$, $F^{b2}_4$, $F^{b2}_5$, $F^{b2}_6$, and $F^{b2}_7$ respectively, for channel R. For example, $Fb_0$ is multiplied with $K^{b2}_0$ to yield an output of $F^{b2}_0$. The output is still represented in frequency domain. The output includes the effect of long echo for channel R. These outputs may be referred to as frequency domain components with long echo effect for channel R.

The output of the FCM 730 corresponding to short echo stored in buffer 746-1 is then processed by the TDTE 732-1 and the output of the TDTE 732-1 is stored in first holding buffer 734-1. TDTE 732-1 converts the output of the FCM 730 from frequency domain to time domain. For example, output of the TDTE 732-1 corresponding to input samples $S^a_0$, $S^a_1$, $S^a_2$, and $S^a_3$ at time $t-1$ are shown as $S^{a1}_0$, $S^{a1}_1$, $S^{a1}_2$, and $S^{a1}_3$ and $S^{a1'}_4$, $S^{a1'}_5$, $S^{a1'}_6$ and $S^{a1'}_7$ in the first holding buffer 734-1. The output of the TDTE 732-1 in the first holding buffer 734-1 shown as $S^{a1}_0$, $S^{a1}_1$, $^{a1}_2$, and $S^{a1}_3$ will be selectively used in time $t-1$. The output of the TDTE 732-1 in the first holding buffer 734-1 shown as $S^{a1'}_4$, $S^{a1'}_5$, $S^{a1'}_6$, and $S^{a1'}_7$ in the first holding buffer 734-1 will be selectively used in the next time slot, namely time t.

TDTE 732-1 converts the output of the FCM 730 from frequency domain to time domain. For example, output of the TDTE 732-1 corresponding to input samples $S^b_0$, $S^b_1$, $S^b_2$, and $S^b_3$ at time $t-1$ is shown as $S^{b1}_0$, $S^{b1}_1$, $S^{b1}_2$, and $S^{b1}_3$ and $S^{b1'}_4$, $S^{b1'}_5$, $S^{b1'}_6$, and $S^{b1'}_7$ in the first holding buffer 734-1. The output of the TDTE 732-1 in the first holding buffer 734-1 shown as $S^{b1}_0$, $S^{b1}_1$, $S^{b1}_2$, and $S^{b1}_3$ will be selectively used in time $t-1$. The output of the TDTE 732-1 in the first holding buffer 734-1 shown as $S^{b1'}_4$, $S^{b1'}_5$, $S^{b1'}_6$, and $S^{b1'}_7$ in the first holding buffer 734-1 will be selectively used in the next time slot, namely time t.

In other words, when the output of the FCM is converted from frequency domain to time domain by the TDTE, two sets of output are generated. A selective first set of output will have effect on the output signal at then current time period (in this case, time $t-1$) and a selective second set of output will have effect on the output signal at next time period (in this case, time t).

The output of the FCM 730 corresponding to long echo stored in buffer 746-2 is then processed by TDTE 732-2 and converts the output from frequency domain to time domain. The output of the TDTE 732-2 is stored in second holding buffer 734-2.

For example, output of the TDTE 732-2 corresponding to input samples $S^a_0$, $S^a_1$, $S^a_2$, and $S^a_3$ at time $t-1$ is shown as $S^a_4$, $S^a_5$, $S^{a2}_6$, and $S^{a2}_7$ and $S^{a2'}_8$, $S^{a2'}_9$, $S^{a2'}_{10}$, and $S^{a2'}_{11}$ in the second holding buffer 734-2. The output of the TDTE 732-2 in the second holding buffer 734-2 shown as $S^{a2}_4$, $S^{a2}_5$, $S^{a2}_6$, and $S^{a2}_7$ will be selectively used in subsequent time t, as this corresponds to long echo effect. The output of the TDTE 732-2 in the second holding buffer 734-2 shown as $S^{a2'}_8$, $S^{a2'}_9$, $S^{a2'}_{10}$, and $S^{a2'}_{11}$ in the second holding buffer 734-2 may be selectively used subsequently in one of the next time slots after time t, depending upon the long echo effect of input samples $S^a_0$, $S^a_1$, $S^a_2$, and $S^a_3$.

In other words, when the output of the FCM is converted from frequency domain to time domain by the TDTE, two sets of output are generated. In the case of long echo effect, a selective first set of outputs will have effect on the output signal at the next time period (in this case, time t) and a selective second set of outputs will have effect on the output signal at a subsequent time period, depending upon the residual effect of the long echo beyond one time period.

TDTE 732-2 converts the output of the FCM 730 for long echo from frequency domain to time domain. For example, output of the TDTE 732-2 corresponding to input samples $S^b_0$, $S^b_1$, $S^b_2$, and $S^b_3$ at time t−1 is shown as $S^{b2}_4$, $S^{b2}_5$, $S^{b2}_6$, and $S^{b2}_7$ and $S^{b2'}_8$, $S^{b2'}_9$, $S^{b2'}_{10}$, and $S^{b2'}_{11}$ in the second holding buffer 734-2. The output of the TDTE 732-2 in the second holding buffer 734-2 shown as $S^{b2}_4$, $S^{b2}_5$, $S^{b2}_6$, and $S^{b2}_7$ will be selectively used in subsequent time t, as this corresponds to long echo effect. The output of the TDTE 732-2 in the second holding buffer 734-2 shown as $S^{b2'}_8$, $S^{b2'}_9$, $S^{b2'}_{10}$, and $S^{b2'}_{11}$ in the second holding buffer 734-2 may be selectively used in one of the next time slots after time t, depending upon the long echo effect of input samples $S^a_0$, $S^a_1$, $S^a_2$, and $S^a_3$.

Selective samples of the first holding buffer 734-1 and second holding buffer 734-2 are added by the OAE 736, to generate convolved audio signal for L channel and R channel and stored in the output buffer 738. For example, convolved audio signal for L channel is represented by $S^{ac}_0$, $S^{ac}_1$, $S^{ac}_2$, and $S^{ac}_3$. Similarly, convolved audio signal for R channel is represented by $S^{bc}_0$, $S^{bc}_1$, $S^{bc}_2$ and $S^{bc}_3$. Functions and features of the OAE 736 will be further described with reference to FIG. 7E.

The de-multiplexer 740 selectively retrieves the convolved audio signal for L channel and R channel from the output buffer 738 and outputs as convolved L channel and convolved R channel signals. For example, convolved $S^{ac}0$, $S^{ac}1$, $S^{ac}2$, and $S^{ac}3$ signals are output in sequence by the de-multiplexer 740 as convolved L channel signals. And, convolved $S^{bc}0$, $S^{bc}1$, $S^{bc}2$, and $S^{bc}3$ signals are output in sequence by the de-multiplexer 740 as convolved R channel signals.

Figure 7E:
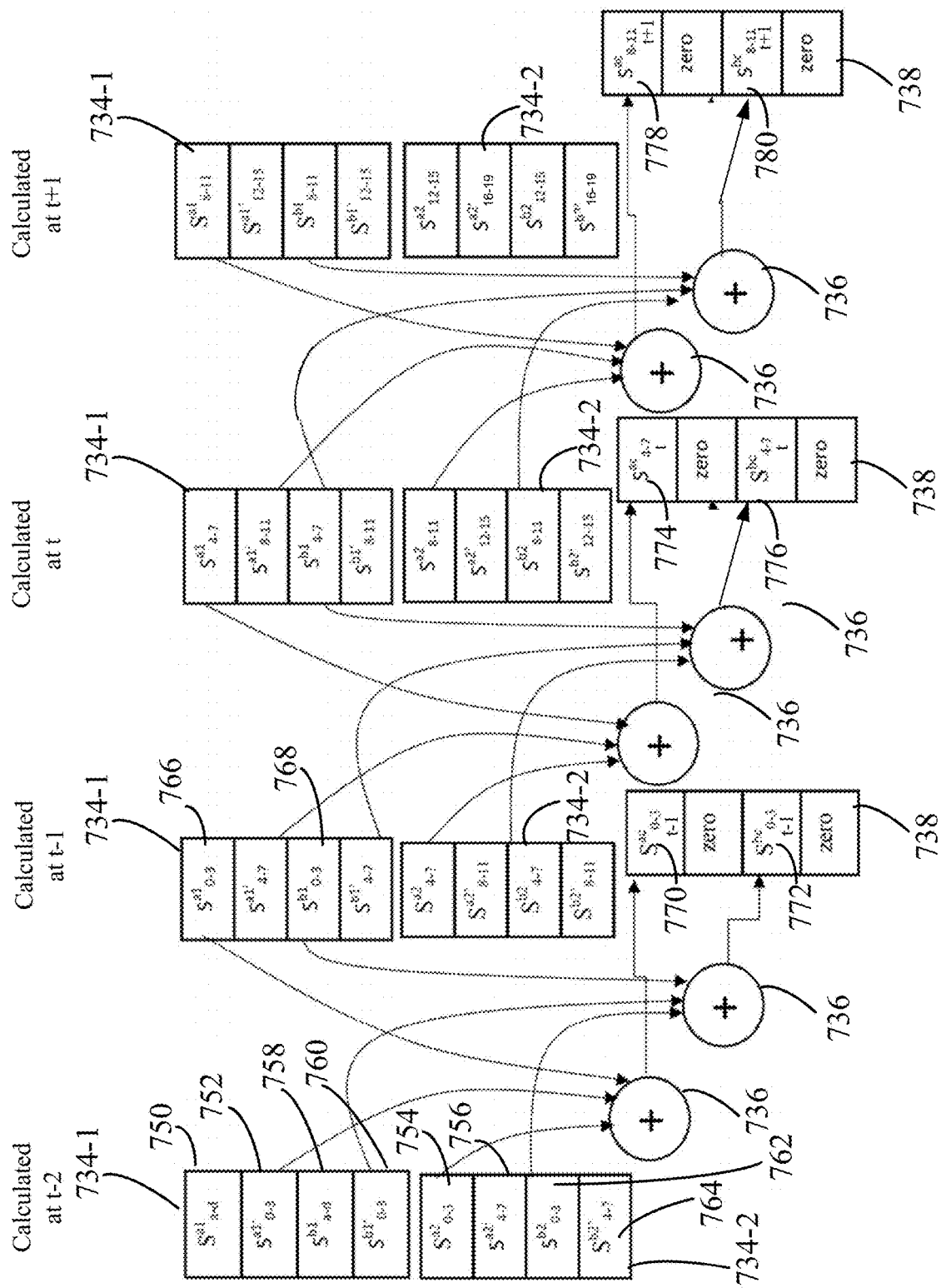
FIG. 7E shows an example operation of the overlap adder engine of the digital signal processor of FIG. 7B, according to an example of this disclosure.

Now, referring to FIG. 7E, various functions and features of the OAE 736 will be described. As previously described, selective samples of the first holding buffer 734-1 and second holding buffer 734-2 are added by the OAE 736, to generate convolved audio signal for L channel and R channel and stored in the output buffer 738. FIG. 7E shows content of the first holding buffer 734-1 and second holding buffer 734-2, after processing various samples of the input signal for L channel and R channel, at times t−2, t−1, t and t+1.

For example, output of the TDTE 732-1 corresponding to input samples $S^a_a$, $S^a_b$, $S^a_c$, and $S^a_d$ for L channel at time t−2 is shown in the first holding buffer 734-1 as $S^{a1}_a$, $S^{a1}_b$, $S^{a1}_c$, and $S^{a1}_d$ in cell 750, and $S^{a1'}_0$, $S^{a1'}_1$, $S^{a1'}_2$, and $S^{a1'}_3$ in cell 752.

Similarly, output of the TDTE 732-2 corresponding to input samples $S^a_a$, $S^a_b$, $S^a_c$, and $S^a_d$ at time t−2 is shown in the second holding buffer 734-2 as $S^{a2}_0$, $S^{a2}_1$, $S^{a2}_2$, and $S^{a2}_3$ in cell 754 and $S^{a2'}_4$, $S^{a2'}_5$, $S^{a2'}_6$, and $S^{a2'}_7$ in cell 756.

For example, output of the TDTE 732-1 corresponding to input samples $S^b_a$, $S^b_b$, $S^b_c$, and $S^b_d$ for R channel at time t−2 is shown in the first holding buffer 734-1 as $S^{b1}_a$, $S^{b1}_b$, $S^{b1}_c$, and $S^{b1}_d$ in cell 758 and as $S^{b1'}_0$, $S^{b1'}_1$, $S^{b1'}_2$, and $S^{b1'}_3$ in cell 760.

Similarly, output of the TDTE 732-2 corresponding to input samples $S^b_a$, $S^b_b$, $S^b_c$, and $S^b_d$ at time t−2 is shown in the second holding buffer 734-2 as $S^{b2}_0$, $S^{b2}_1$, $S^{b2}_2$, and $S^{b2}_3$ in cell 762 and as $S^{b2'}_4$, $S^{b2'}_5$, $S^{b2'}_6$, and $S^{b2'}_7$ in cell 764.

Output of the TDTE 732-1 corresponding to input samples $S^a_0$, $S^a_1$, $S^a_2$, and $S^a_3$ for L channel at time t−1 is shown in the first holding buffer 734-1 as $S^{a1}_0$, $S^{a1}_1$, $S^{a1}_2$, and $S^{a1}_3$ in cell 766 and $S^{b1}_0$, $S^{b1}_1$, $S^{b1}_2$, and $S^{b1}_3$ in cell 768.

In general, subscripts (a-d), (0-3), (4-7), (8-11), (12-15), (16-19) in holding buffers 734-1 and 734-2 for each calculated time slot (for example, time slots t−2, t−1, t, and t+1) indicate the output samples for which the corresponding block of data for short echo effect and long echo effect is selectively added by the OAE 736.

Having shown contents of the holding buffer at various time slots for various input samples, function of the OAE 736 is now described. At time t−1, the OAE 736 selectively adds the contents of cell 752, which holds $S^{a1'}_{0-3}$ (from time t−2) with contents of cell 754 which holds $S^{a2}_{0-3}$ (from time t−2) and contents of cell 766, which holds $S^{a1}_{0-3}$ (from time t−1) to generate convolved output $S^{ac}_{0-3}$ as shown in cell 770 of output buffer 738, as convolved output at time t−1, for L channel.

Similarly, the OAE 736 selectively adds the contents of cell 760, which holds $S^{b1'}_{0-3}$ (from time t−2) with contents of cell 762 which holds $S^{b2}_{0-3}$ (from time t−2) and contents of cell 768, which holds $S^{b1}_{0-3}$ (from time t−1) to generate convolved output $S^{bc}_{0-3}$ as shown in cell 772 of output buffer 738, as convolved output at time t−1, for R channel.

The OAE 736 selectively adds selective contents of the holding buffer 734-1 and 734-2 at various time slots to generate corresponding convolved output for L channel and R channel. For example, cell 774 shows convolved output $S^{ac}_{4-7}$ (at time t) for L channel and cell 766 shows convolved output $S^{bc}_{4-7}$ (at time t) for R channel. Similarly, cell 778 shows convolved output $S^{ac}_{8-11}$ (at time t+1) for L channel and cell 780 shows convolved output $S^{bc}_{8-11}$ (at time t+1) for R channel.

As one skilled in the art appreciates, the overlap adder selectively adds portions of the output of the TDTE with short echo effect and long echo effect from a given time period with portions of the output of the TDTE from the next time period to generate a convolved output signal.

As one skilled in the art appreciates, there can be additional filter coefficients representing additional convolution to the input signal. For example, there can be a set of filter coefficients representing, say, a long-long echo (for example, due to multiple reflections of the sound signal in a specified space), which may have an effect on a subsequent set of input signals. As an example, signals sampled at time t−2 may have an effect on the convolved output signal at time t. The example system described with reference to FIGS. 7D and 7E may be advantageously modified to accommodate for additional filter coefficients. These additional filter coefficients are then selectively multiplied with the output of the FDTE 729 to generate an output, which is further converted to time domain by the TDTE 732 to yield output in time domain that is stored in the holding buffer 734, output of which is selectively added by the overlap adder to generate a convolved output signal.

Although example system herein is described with reference to two channels of input signal, system described herein may be expanded to additional channels of input signal, with corresponding additional processing circuitry.

Figure 8A:
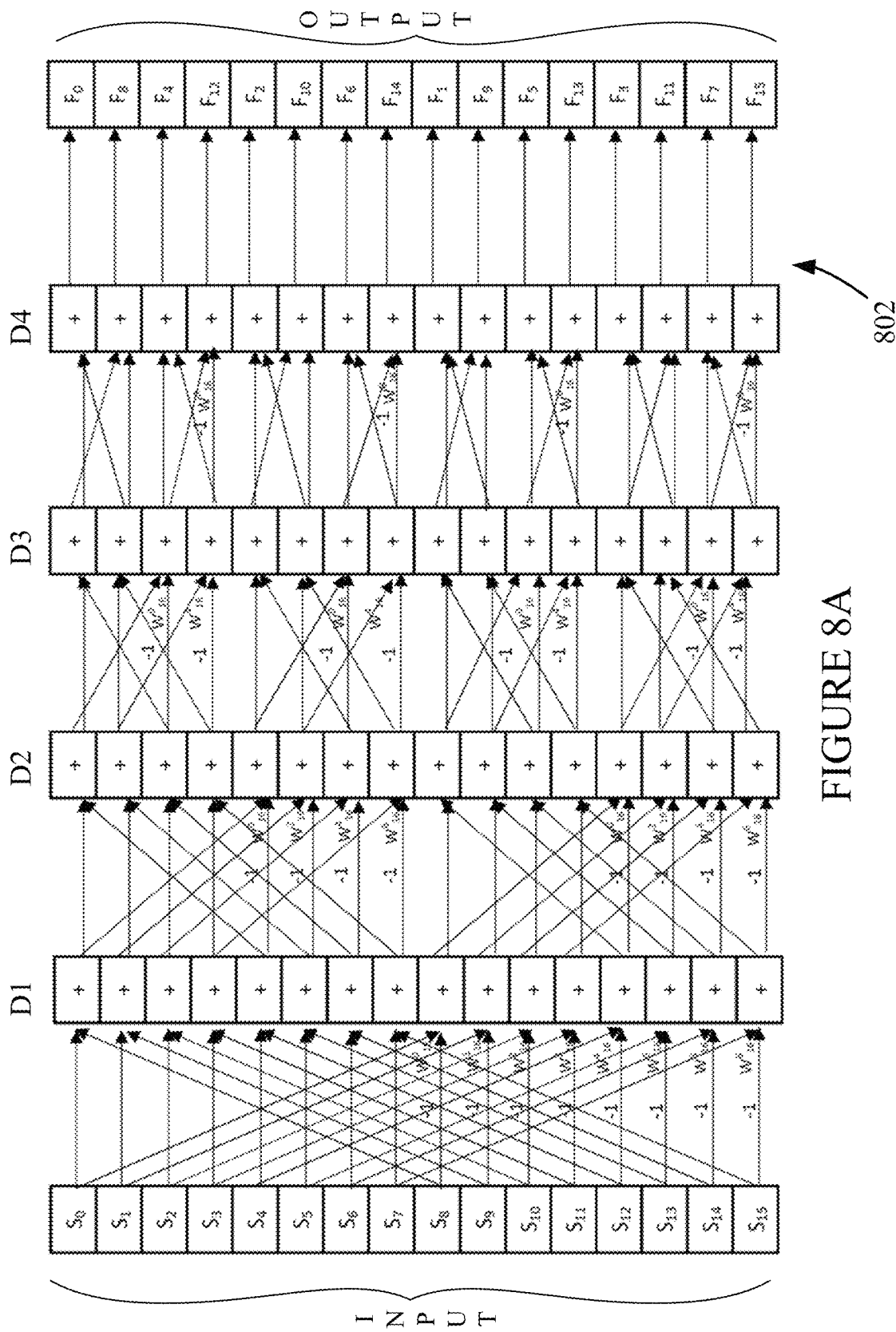
FIG. 8A shows an example operation of a typical fast Fourier transform engine, with decimation in frequency algorithm, according to an example of this disclosure.
Figure 8B:
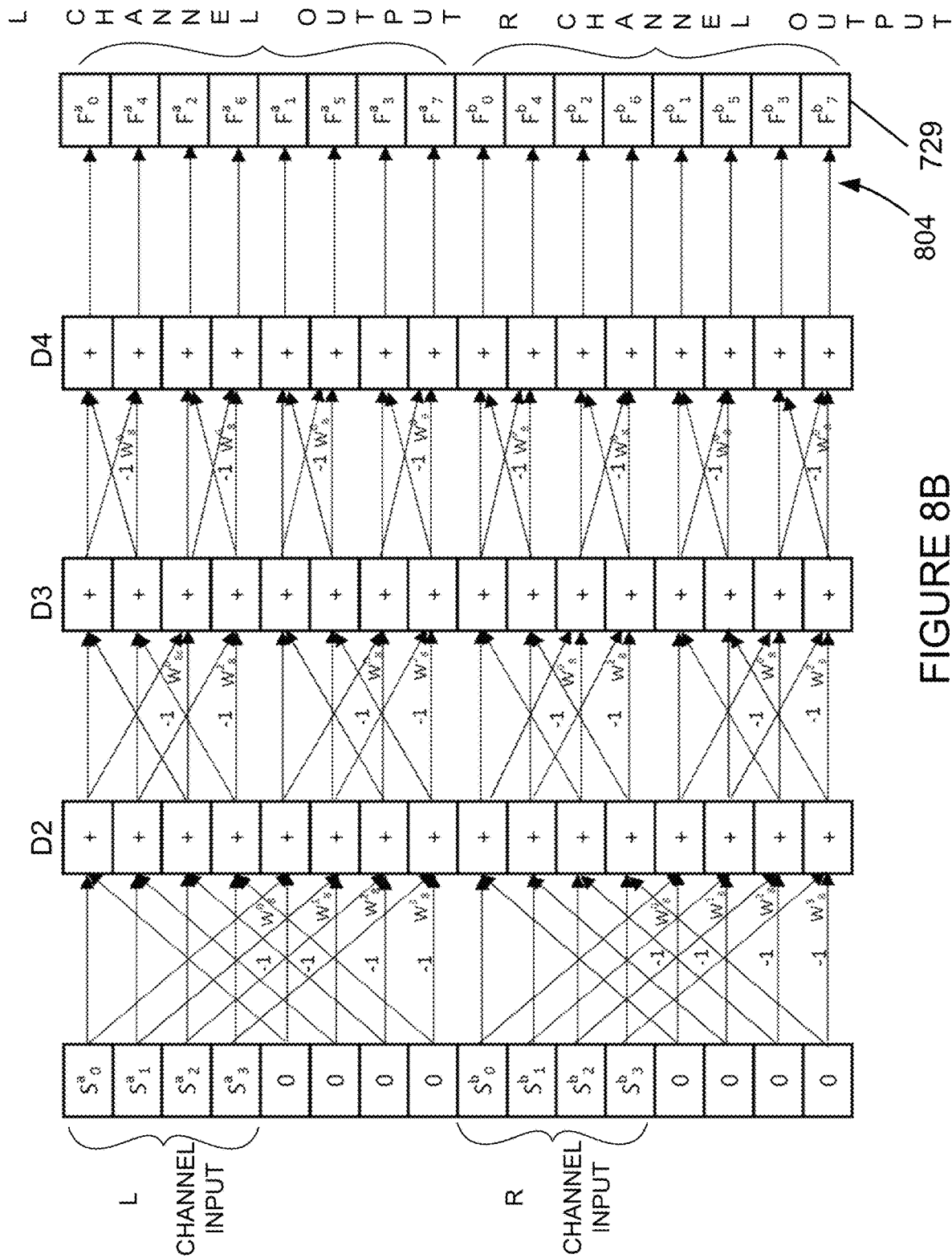
FIG. 8B shows an example operation of a modified fast Fourier transform engine, with decimation in frequency algorithm, according to an example of this disclosure.

Now, referring to FIGS. 8A and 8B, salient differences between a traditional 16 input FFT and modified FFT used in FDTE 728 are described. FIG. 8A shows a traditional FFT

802 with decimation in frequency FFT algorithm. FFT 802 is configured to process 16 inputs $S_0$ to $S_{15}$ received in time domain. The twiddle factors w are calculated for 16 point FFT for FFT 802. The FFT 802 goes through four decimation steps, namely D1, D2, D3, and D4 and gives an output $F_0$-$F_{15}$ in frequency domain. As one skilled in the art appreciates, the sequence of the output $F_0$-$F_{15}$ is bit reversed, in the sense that the output sequence for inputs $S_0$ to $S_7$ are intermingled with output sequence for inputs $S_8$ to $S_{15}$. When we multiplex L channel input with R channel input, the output of the FFT 802 will provide a bit reversed output, intermingling output corresponding to L channel with output corresponding to R channel.

Now, referring to FIG. 8B, modified FFT 804 is described. Modified FFT 804 is configured to process 16 inputs, with first 8 inputs allocated to L channel (first portion 742, with p=2) and second 8 inputs are allocated to R channel (second portion 744, with p=2). Further, of the first 8 inputs allocated to L channel, only four inputs are used ($S^a_0$, $S^a_1$, $S^a_2$, and $S^a_3$) and rest of the inputs are set to zero. Of the second 8 inputs allocated to R channel, only four inputs are used ($S^b_0$, $S^b_1$, $S^b_2$, and $S^b_3$) and rest of the inputs are set to zero. The twiddle factors w are calculated for 8 point FFT for modified FFT 804. The modified FFT 804 goes through three decimation steps, namely D2, D3, and D4. Modified FFT 804 gives an output $F^a_0$-$F^a_7$ in frequency domain for L channel input ($S^a_0$, $S^a_1$, $S^a_2$, and $S^a_3$) and an output $F^a_8$-$F^a_{15}$ in frequency domain for R channel input ($S^b_0$, $S^b_1$, $S^b_2$, and $S^b_3$), as shown in block 729. Modified FFT 804 as described herein provides a separation between L channel output and R channel output in frequency domain. This facilitates further processing of the input signal in frequency domain, while maintaining separation between L channel and R channel inputs.

In general, number of decimation steps y in the modified FFT 804 will be equal to p+1. So, for a value of p=2, the number of decimation steps y will be 2+1=3, and the sample size x for each channel will be $2^p$, which is equal to $2^2$=4. And, for a value of p=3, the number of decimation steps y will be 3+1=4, and the sample size x for each channel will be $2^p$, which is equal to $2^3$=8.

Figure 9A:
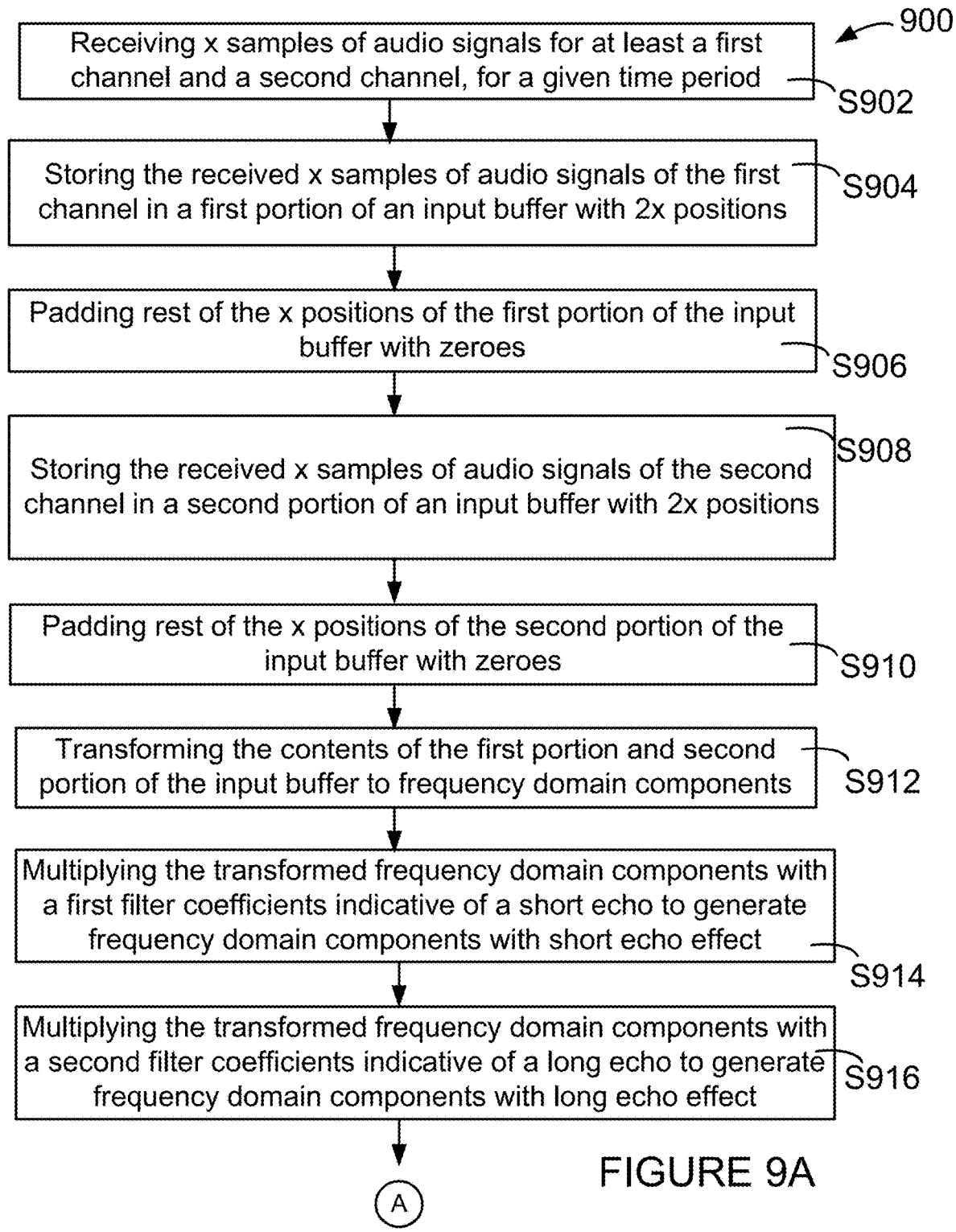
FIGS. 9A and 9B show another example flow diagram, according to an example of this disclosure.
Figure 9B:
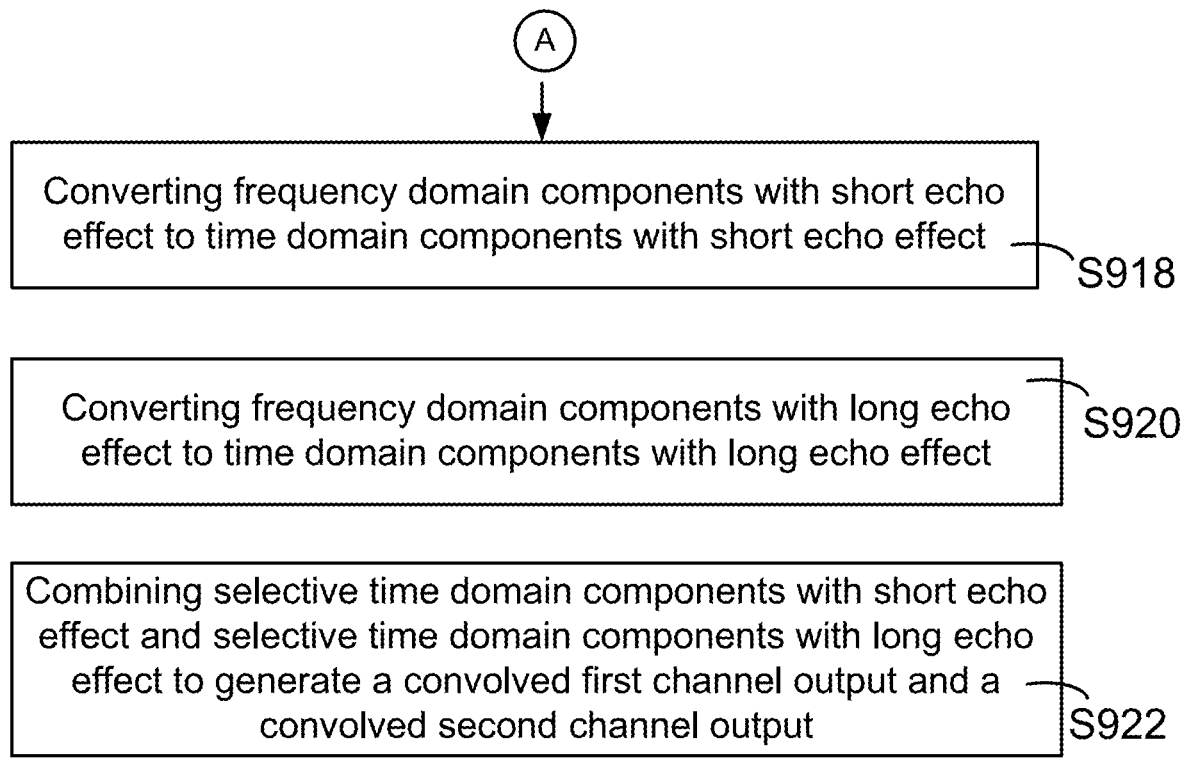

Now, referring to FIGS. 9A and 9B, an example flow diagram 900 will be described. In block S902, x samples of audio signals for at least a first channel and a second channel will be received, for a given time period. For example, the digital signal processor 408-1, as previously described, will receive samples of audio signals from L channel as samples $S^a_0$, $S^a_1$, $^a_2$, and $S^a_3$ and samples of audio signals from R channel as samples $S^b_0$, $S^b_1$, $S^b_2$, and $S^b_3$.

In block S904, the received x samples of audio signals of the first channel are stored in a first portion of an input buffer, with 2x positions. For example, the received samples of the first channel are stored in first portion 742 of the input buffer 726. For example, samples $S^a_0$, $S^a_1$, $S^a_2$, and $S^a_3$ are stored in the first portion 742 of the input buffer 726.

In block S906, rest of the x positions of the first portion of the input buffer is padded with zeros. For example, referring to FIG. 7D, we notice, rest of the 4 positions of the first portion 742 are filled with zeroes.

In block S908, the received x samples of audio signals of the second channel are stored in a second portion of an input buffer, with 2x positions. For example, the received samples of the second channel are stored in the second portion 744 of the input buffer 726. For example, samples $S^b_0$, $S^b_1$, $S^b_2$, and $S^b_3$ are stored in the second portion 744 of the input buffer 726.

In block S910, rest of the x positions of the second portion of the input buffer are padded with zeros. For example, referring to FIG. 7D, we notice, rest of the 4 positions of the second portion 744 are filled with zeroes.

In block S912, the contents of the first portion and the second portion are transformed to frequency domain components. For example, contents of the first portion of the input buffer are transformed into frequency domain components as $F^a_0$, $F^a_1$, $F^a_2$, $F^a_3$, $F^a_4$, $F^a_5$, $F^a_6$ and $F^a_7$, by the frequency domain transformation engine 728, as shown in FDTE output 729. And, contents of the second portion of the input buffer is transformed into frequency domain components as $F^b_0$, $F^b_1$, $F^b_2$, $F^b_3$, $F^b_4$, $F^b_5$, $F^b_6$ and $F^b_7$, by the frequency domain transformation engine 728, as shown in FDTE output 729.

In block S914, the transformed frequency domain components are multiplied with a first filter coefficients indication of a short echo, to generate frequency domain components with short echo effect. For example, the transformed frequency domain components shown in FDTE output 729 are multiplied with filter coefficients 722-1, to generate frequency domain components with short echo effect, as shown in block 746-1.

In block S916, the transformed frequency domain components are multiplied with a second filter coefficients indicating a long echo, to generate frequency domain components with long echo effect. For example, the transformed frequency domain components shown in FDTE output 729 are multiplied with filter coefficients 722-2, to generate frequency domain components with long echo effect, as shown in block 746-2.

In block S918, the frequency domain components with short echo effect are converted to time domain components with short echo effect. For example, the time domain transformation engine 732 converts the frequency domain components with short echo in block 746-1 to time domain components with short echo effect, as shown in block 734-1.

In block S920, the frequency domain components with long echo effect are converted to time domain components with long echo effect. For example, the time domain transformation engine 732 converts the frequency domain components with long echo in block 746-2 to time domain components with long echo effect, as shown in block 734-2.

In block S922, selective time domain components with short echo effect and selective time domain components with long echo effect are combined to generate a convolved first channel output and a convolved second channel output. For example, overlap adder 736 selectively adds time domain components with short echo effect and selective time domain components with long echo effect, as described in detail, with reference to FIG. 7E.

Having described various functions and features of the digital signal processor 408-1 and integrated convolution generator 720, other example implementations of this disclosure are now described. For example, a spatial emulation appliance will now be described.

Figure 10:
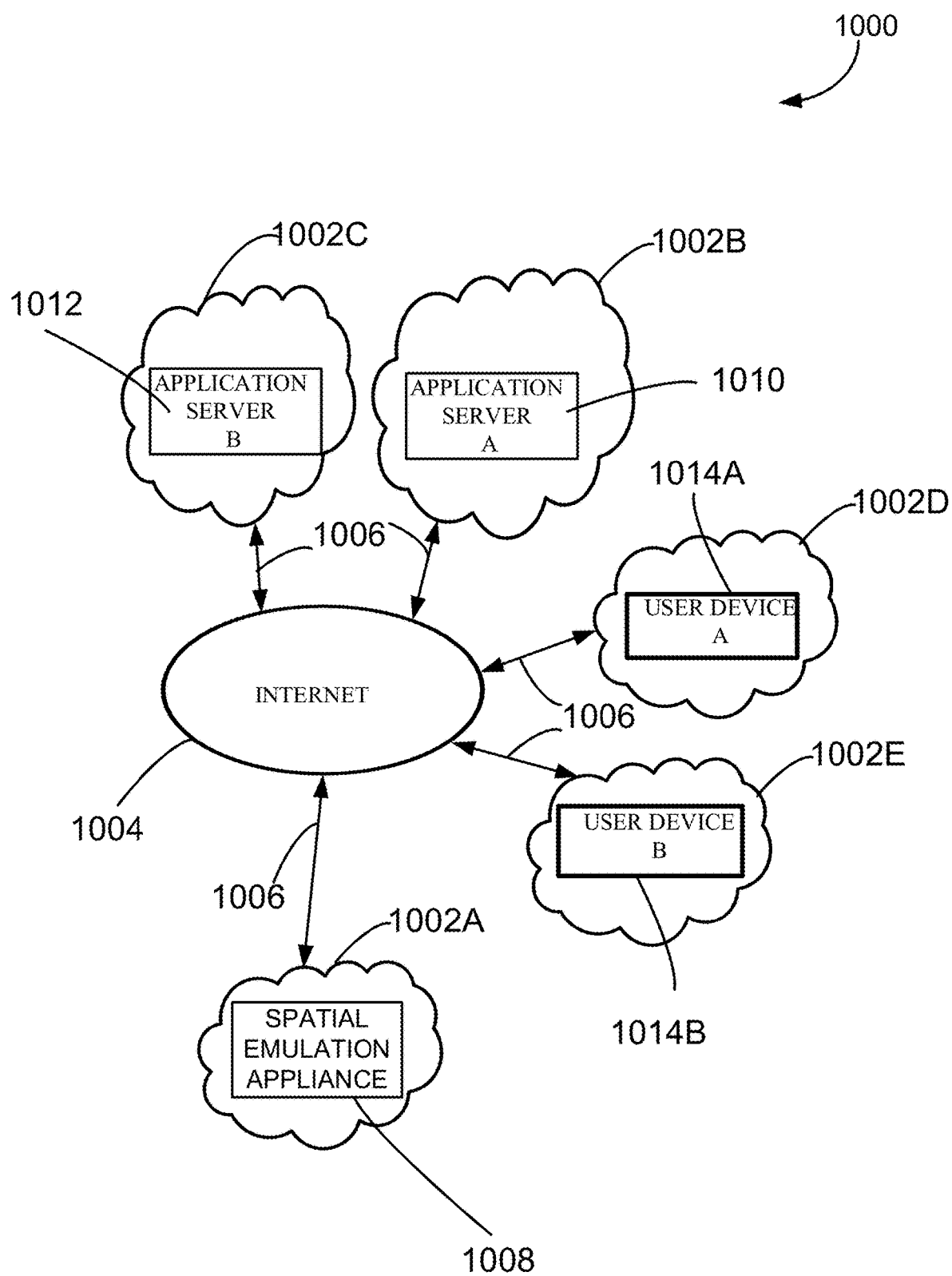
FIG. 10 shows an example network environment, according to an example of this disclosure.

FIG. 10 depicts an example network computing environment 1000. The network computing environment 1000 may have a plurality of computing resources, for example, computing resources 1002A, 1002B, 1002C, 1002D, and 1002E all connected to internet 1004, over link 1006. In some examples, computing resources 1002A, 1002B, 1002C, 1002D, and 1002E may be a decentralized or cloud computing resource, for example, cloud computing resource provided by vendors like Amazon® or Microsoft®. In some examples, the computing resources 1002A, 1002B, 1002C, 1002D, and 1002E may be a combination of standalone computing resources connected to the internet 1006 and cloud computing resources.

A spatial emulation appliance 1008 may be executed in computing resource 1002A. Additionally, one or more application servers may be executed in computing resource 1002B and 1002C. For example, application server A 1010 is executed on computing resource 1002B and application server B 1012 is executed on computing resource 1002C. As one skilled in the art appreciates, application servers may be configured to provide one or more services.

In some examples, application servers may be configured as an audio streaming server, configured to provide an audio content to a subscriber. In some examples, application servers may be configured as an audio-visual streaming server configured to provide either pre-recorded or live audio-visual content. In some examples, application servers may be configured as a gaming server, configured to deliver one or more games to users to play. In some examples, one of the application servers may be configured as an authentication server configured to authenticate a user to provide access to various services and functions. For example, selective access to the spatial emulation appliance may be granted to one or more users, based on verification of credentials of a user by the authentication server. As one skilled in the art appreciates, these are only some of the examples of functions and features of application servers and application servers may be configured to provide various other services.

FIG. 10 also depicts user device A 1014A and user device B 1014B. In one example, the user device A 1014A is executed in the computing resource 1002D and user device B 1014B is executed in computing resource 1002E. The user device A 1014A and user device B 1014B are also configured to be coupled to the internet 1004 over link 1006. In one example, the user device A 1014A and user device B 1014B may be configured to selectively access one or more of the application server A 1010, application server B 1012, and spatial emulation server 1008 and seek services provided by these servers. For example, user device A 1014A and user device B 1014B may be configured to selectively access a media server, for example, an audio server and be served or streamed with an audio file, for example, music created by an artist.

Figure 11:
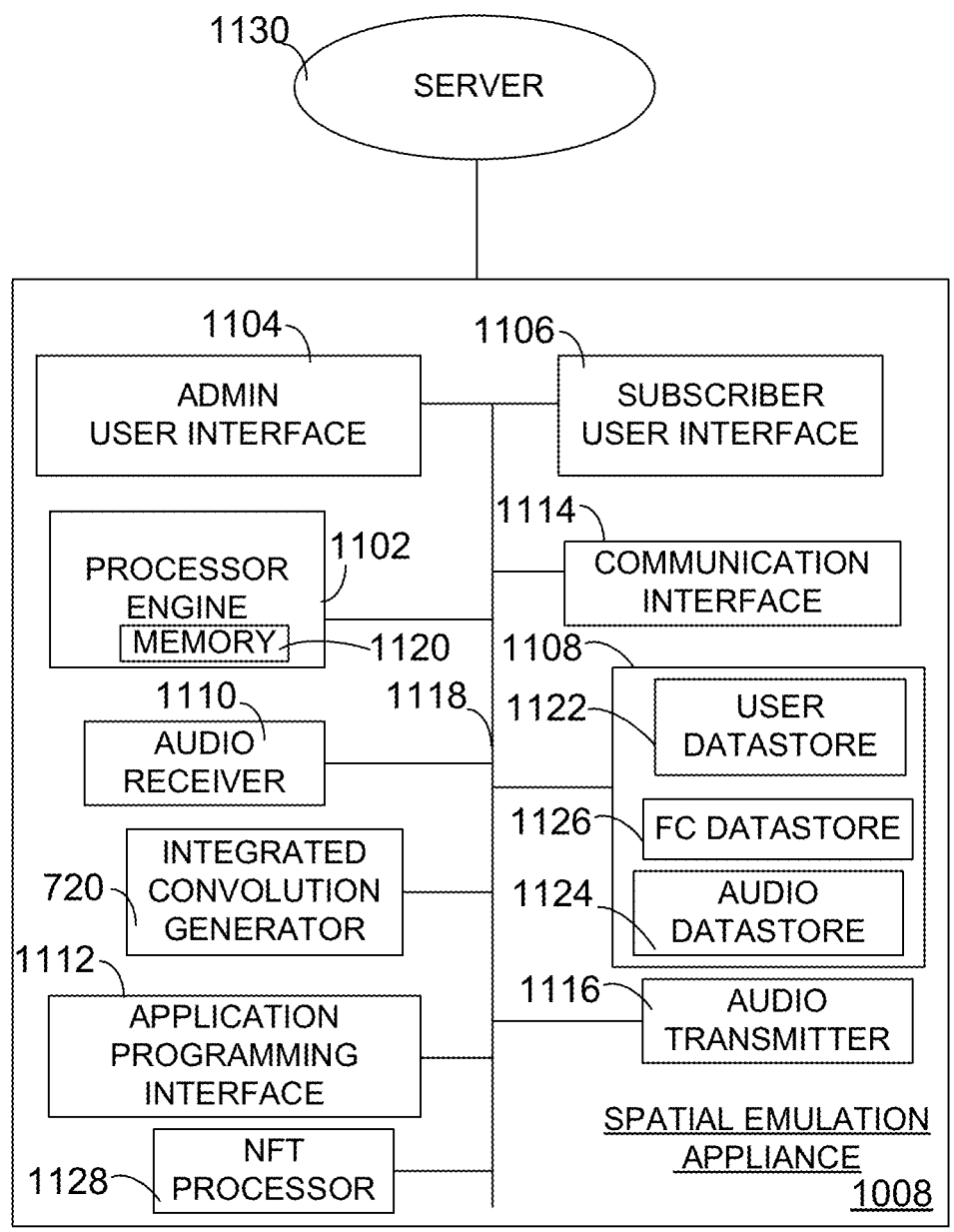
FIG. 11 shows an example spatial emulation appliance, according to an example of this disclosure.

Now, referring to FIG. 11, example spatial emulation appliance 1008 of this disclosure will be described. The spatial emulation appliance 1008 includes a processor engine 1102, admin user interface 1104, subscriber user interface 1106, data store 1108, audio receiver 1110, application programming interface (API) 1112, integrated convolution generator 720, a communication engine 1114, audio transmitter 1116, all coupled over a bus 1118. Various function and features of the spatial emulation appliance 1008 will now be described. Detailed operation of the spatial emulation appliance 1008 will be later described with reference to additional examples and figures.

The processor engine 1102 is configured to perform various arithmetic and logical functions of the spatial emulation appliance 1008. The memory 1120 is used to stored and retrieve various programs, sub-routines, including transient and permanent information used or created by the processor engine 1102. The data store 1108 is used to store and retrieve various information generated, received or used by the spatial emulation appliance 1008. In one example, the data store 1108 may include a user data store 1122, an audio data store 1124, a filter coefficients data store 1126, and a NFT processor 1128. In one example, the filter coefficients data store 1126 may store various filter coefficients 722. In one example, the NFT processor 1128 may be configured to process information associated with a Non-Fungible Token (NFT) indicative of the authenticity of a physical space represented by a specific set of filter coefficients.

The admin user interface 1104 is configured to present an admin user interface to receive one or more information from an admin user of the spatial emulation appliance 1008. As one skilled in the art appreciates, an admin user may have certain privileges that may be different from a subscriber user. The subscriber user interface 1106 is configured to present a subscriber user interface to receive one or more information from a subscriber user of the spatial emulation appliance 1008. As one skilled in the art appreciates, a subscriber user may have certain privileges that may be different than an admin user. In one example, various information received from a subscriber user may be stored in the user data store 1122.

The audio receiver 1110 is configured to receive audio signals into the security appliance. In one example, the audio signals received may be stored in the audio data store 1124. Audio signals may be received from various sources, for example, one or more of the application servers, for example, application server 1010 and 1012. In some examples, the received audio signal may correspond to a plurality of channels, for example, left channel and right channel. In one example, the received audio signals may be in a digital form. In some examples, the received audio signals may be encrypted.

As one skilled in the art appreciates, various audio signals received by the spatial emulation appliance 1008 may conform to different protocols. The audio receiver 1110 in one example is configured to decipher various audio signals and attributes related to the audio signals. The audio signal and corresponding attributes are stored in the audio data store 1124 for further processing. Some of the attributes may include specific physical spaces which the user desires to emulate under predefined conditions. In some examples, the attributes may include the results of machine analysis performed by the processor engine 1102, recommending specific emulated spaces optimal for music of certain styles, genres, or other media characteristics, and the like. In other examples, the machine analysis can occur in a processor outside of the spatial emulation appliance 1008, and the results of the analysis are sent to the spatial emulation appliance 1008 through the communication Interface 1114. Received results are analyzed by the processor Engine 1102 to selectively use a desired filter coefficients stored in the FC Data Store 1126.

The application programming interface 1112 provides an interface to communicate with various external services, for example, services provided by one or more application servers. For example, a streaming audio service, a streaming audio-video service, a gaming service and the like.

As one skilled in the art appreciates, the spatial emulation appliance 1008 may communicate with various external devices using one or more different communication protocols. Various elements of the spatial emulation appliance 1008 are configured to communicate with external devices through the communication interface 1114, using one or more protocols recognized by one or more external devices.

The audio transmitter 1116 may be configured to receive convolved audio signals generated by the integrated convolution generator 720, based on selected filter coefficients stored in the FC datastore 1126. In one example, the audio transmitter 1116 may be configured to mix one or more background music or sounds selected by a user. In such an example, a user may provide background music or sounds they may want to mix with the convolved audio signals. In one example, such background music or sounds may be stored in the user data store 1122 and selectively retrieved by the audio transmitter 1116 for mixing with the convolved audio signals. The audio transmitter 1116 may in one example may be configured to package the convolved audio signals so as to permit a user device, for example, user device A 1014A or user device B 1014B to decode and reproduce the convolved audio signals.

An example integrated convolution generator 720 has been previously described in detail, with reference to FIGS. 7A to 9B. In some examples, some of the functions and features of the digital signal processor 408, as previously described with reference to FIG. 4, may be incorporated in the spatial emulation appliance 1008. In some examples, a CH distortion generator 444 may be incorporated in the spatial emulation appliance 1008. In some examples, a middle side filer 446 may be incorporated in the spatial emulation appliance 1008. As previously described, received audio signals may be further modified by selectively using the CH distortion generator 444 and the middle side filter 446, before presenting the modified audio signal to the audio transmitter 1116.

In some examples, the audio transmitter 116 may transmit the modified audio signal in digital form and a D/A converter 410, as previously described with reference to FIG. 4, along with an amplifier 412, and an analog output tuner 414 may further process the received modified audio signal in digital form and convert the modified audio signal to analog form prior to feeding to an audio reproduction device 448.

In one example, the NFT Processor 1128 may be configured to process a Non-Fungible Token (NFT) indicative of the authenticity of a physical space represented by a specific set of filter coefficients. As one skilled in the art appreciates, a user may be presented on the user device A 1014A or user device B 1014B with one or more physical spaces for selection. In one example, the subscriber user interface 1106 may be configured to present one or more choices of physical space for selection by the user of the user device A 1014A or user device B 1014B. Based on the user selection, filter coefficients corresponding to the selected physical space are used by the integrated convolution generator 720 to generate convolved audio signals. And, based on user selection, a specific NFT can be processed, indicative of the authenticity of the selected physical space. In one example, a link to the NFT is provided to the user. In one example, a server 1130 may be used to generate an NFT. In some examples, the generated NFT is based on a blockchain technology. An example configuration of a generated NFT will be later described in detail.

Figure 11B:
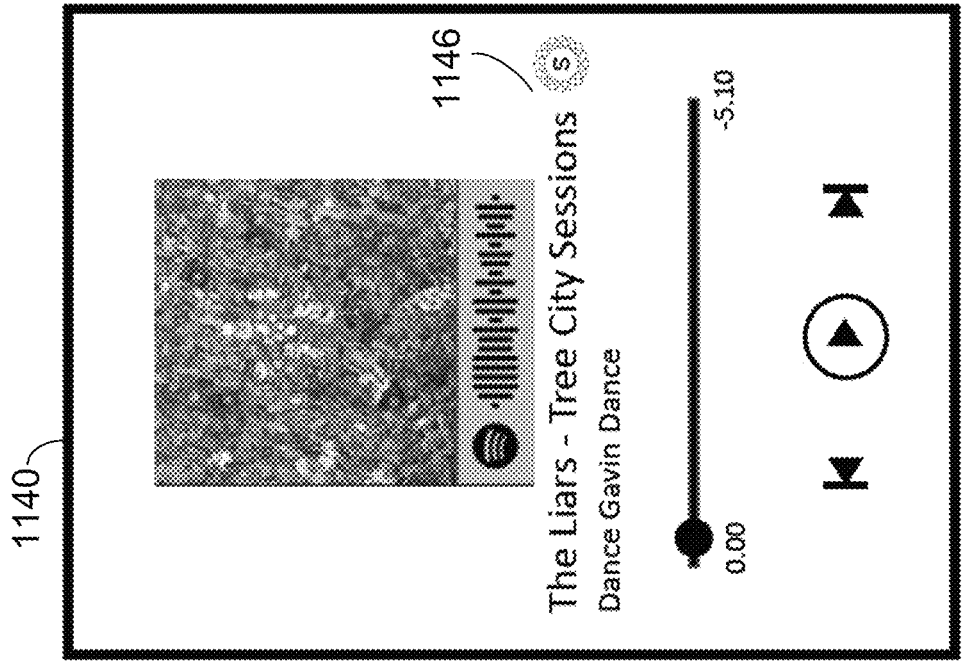
FIGS. 11A and 11B show example user interface of a user device, according to an example of this disclosure.
Figure 11A:
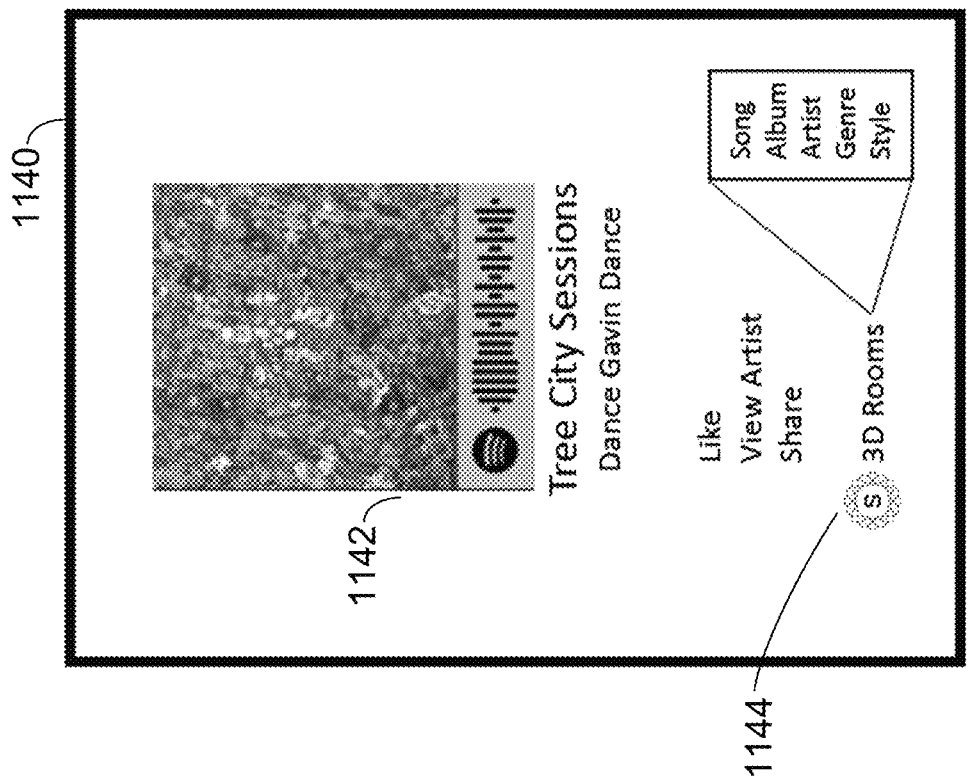

Now, referring to FIGS. 11A and 11B, example user interface presented to a user device, for example, user device A 1014A by the spatial emulation appliance 1008 is described. Now, referring to FIG. 11A, user interface screen 1140 is shown. The user interface screen 1140 includes various selection icons presented to a user. In this example, the user has already selected a media to be reproduced on the user device A 1014A, shown by icon 1142, for example, an audio music titled "Dance Gavin Dance". Additionally, the user of the user device A 1014A is presented with a "3D rooms" icon 1144, which when selected will present one or more physical spaces to be used to emulate the reproduction of the selected media, for example, content titled "Dance Gavin Dance". The user will select one of the presented physical spaces. This will indicate to the space emulation appliance 1008 to select filter coefficients and other processing parameters corresponding to the selected physical space. For example, other processing parameters may be presented as a drop down menu 1146. In some examples, other processing parameters may include the song, album, artist, genre, and style of music. Selected filter coefficients and other processing parameters are used to render the received audio as if it were being heard within the represented physical space. In some examples, the user may preselect specific spaces to be emulated for specific songs, albums, artists, or genres. In other cases, the processor engine 1102 located in the space emulation appliance 1008 may analyze the content, and select spaces to be emulated depending upon certain characteristics of the content. In other examples, the machine analysis can occur in a processor outside of the spatial emulation appliance 1008, and the results of the analysis are sent to the spatial emulation appliance 1008 through the communication Interface 1114. Received results are analyzed by the processor Engine 1102 to selectively use desired filter coefficients stored in the FC Data Store 1126.

Thereafter, the space emulation appliance 1008 will selectively modify the audio signals using the selected filter coefficients, and other processing parameters to generate a convolved audio signal. The convolved audio signal corresponding to the selected media "Dance Gavin Dance" is then reproduced on the user device A 1014A. Referring to FIG. 11B, we notice that the user interface screen 1140 is showing the selected media ready to be reproduced on the user device A 1014A. In one example, selective portion of the icon 1144 is also displayed on the user interface screen, for example, as icon 1148, indicating the selected media will be played using a physical space selected by the user.

As one skilled in the art appreciates, various elements of the spatial emulation appliance 1008 may be distributed between two or more computing devices. For example, some of the elements of the spatial emulation appliance 1008 may be disposed in a user device itself or an audio reproduction device, for example, in a headphone. In such an implementation, some of the elements of the spatial emulation appliance 1008 may be disposed in the user device and some of the elements may be disposed in the audio reproduction device coupled to the user device. In such an implementation, the audio reproduction device may include a storage device to store one or more sets of filter coefficients, and sufficient computing power to execute the integrated convolution generator 720 in the audio reproduction device. Selection of a specific physical space by a user may be presented by the user device.

In yet another example, some of the elements of the spatial emulation appliance may be disposed in another computing device coupled to the user device, for example, a gaming console coupled to the user device. An example implementation may provide for selection of a specific physical space by a user presented on a user device, by the game console. The selected physical space may then be communicated to the spatial emulation appliance 1008, which in some examples may be disposed in an audio reproduction device.

Figure 11C:
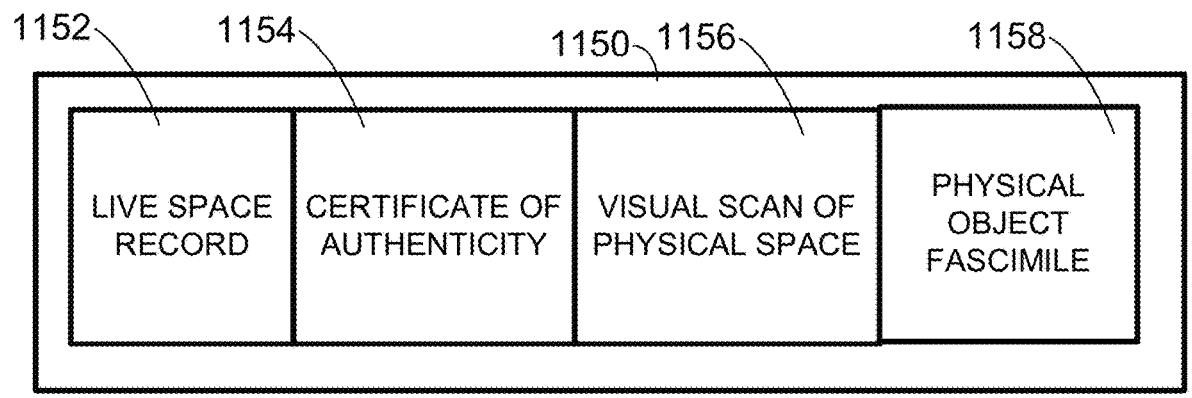
FIG. 11C shows an example format of a non-fungible token (NFT), according to an example of this disclosure.

Now, referring to FIG. 11C, an example NFT format is described. FIG. 11C shows an NFT 1150 which includes a plurality of elements or fields. NFT 1150 includes a live space record 1152 field. Field 1154 is indicative of the certificate of authenticity of the spatial acoustic model. In one example, the certificate of authenticity is validated by an individual or a group familiar with the characteristics of the selected space. Field 1156 is an image or collection of images of the selected space. In one example, the image may be a 3D rendition of the selected space. Field 1158 is an image of a physical object. In one example, the physical object may be a plaque similar to a gold record used in the audio recording industry. The plaque may include one or more of: a code indicative of the blockchain identifier of the specific emulated space, a seal representative of the brand of the emulated space such as an iconic venue or a legendary recording studio, and so forth. As one skilled in the art appreciates, these are some of the fields to be included in the creation of the NFT when it is minted. Additional fields may be included, based on the characteristic of the media content, venue, or brand.

Figure 11D:
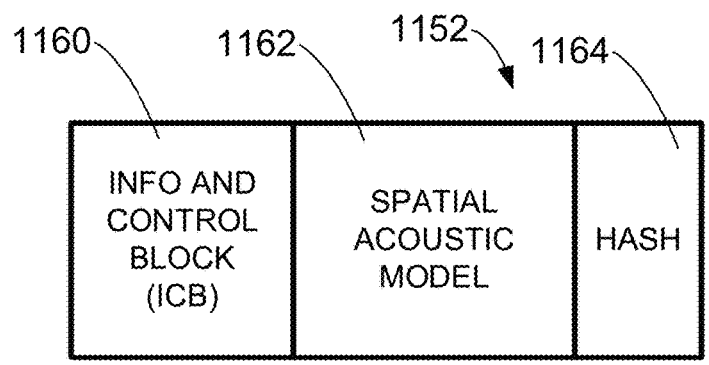
FIG. 11D shows an example live space record, according to an example of this disclosure.

Now, referring to FIG. 11D, an example live space record 1152 is described. The live space record 1152 includes an info and control block (ICB) 1160, spatial acoustic model 1162, and hash code 1164. The info and control block (ICB) 1160 is indicative of information specific to the physical space represented, and specifications related to its control. For example, it may contain information such as original owner or creator, date created, valid usage period, and others. In some cases, ICB 1160 may be uniquely encrypted or otherwise protected in such a way that it is challenging to modify or decode except for those with specific authorization. The spatial acoustic model 1162 is indicative of the convolution coefficients of a specific physical space, and all other processing information and parameters necessary for the spatial emulation appliance 1008 to render the spatially emulated audio signal. Hash code 1164 may be included, to enable verifying that the contents of all or parts of the live space record 1152 are original and unaltered. In some examples, the live space record 1152 may be encrypted. One or more encryption methods may be used. In some examples, a public key/private key encryption may be used. In some examples, a private key may be used to decode the encrypted data. In some examples, the live space record 1152 may be contained within an NFT 1150. In some examples, the live space record 1152 may be used independent of the NFT 1150.

In some examples, pointers or links to the NFT 1150 may be accessed using blockchain technology. In some examples, one or more of the fields of the NFT 1150 may include pointers or links to access details of the specific fields. These pointers or links to access details of the specific fields may be created using blockchain technology. As an example, the live space record 1152 field in some examples may include various fields of data (for example data related to ICB or spatial acoustic model) and in some examples may contain a pointer to access various fields of data (for example data related to ICB or spatial acoustic model).

Figure 11E:
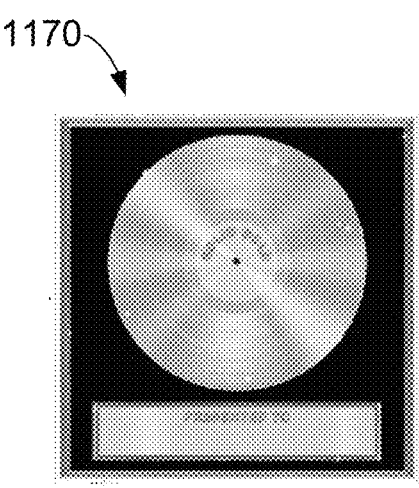
FIG. 11E shows an example plaque, according to an example of this disclosure.

An example of the physical object depicted in the field 1158 in the form of a physical plaque 1170 is as shown in FIG. 11E. As one example, the physical plaque 1170 may be similar to "gold record" plaques awarded in the audio industry. The physical plaque 1170 may also be engraved or labeled with unique information representative of the NFT.

In some examples, the physical object depicted in the field 1158 may correspond to an audio reproduction device, for example a head phone. In some examples, a copy of the live space record 1152 may be stored in a datastore in the audio reproduction device. And, the audio reproduction device may be selectively configured to extract details of the live space record. The audio reproduction device may selectively use the spatial acoustic model contained in the live space record to modify a received audio signal for reproduction by the audio reproduction device.

Having described an example spatial emulation appliance 1008 of this disclosure, an example flow diagram 1200 will now be described with reference to FIG. 12.

Figure 12:
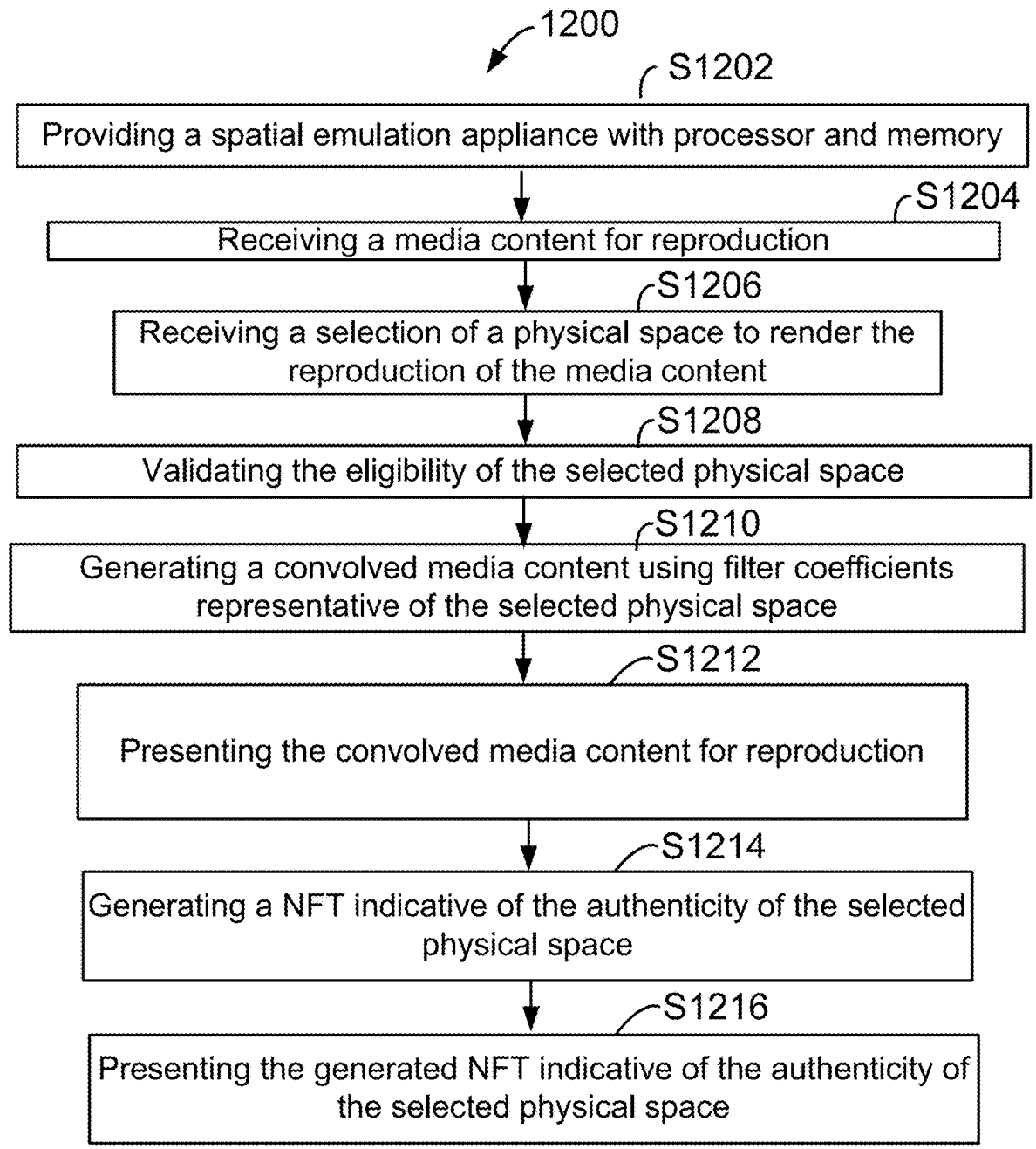
FIG. 12 shows an example flow diagram, according to an example of this disclosure.

Now, referring to FIG. 12, flow diagram 1200 is shown. In block S1202, a spatial emulation appliance, with a processor and memory is provided. For example, spatial emulation appliance 1008 as previously described with reference to FIG. 11 is provided. In block S1204, media content is received for reproduction. For example, a user of a user device, for example, user device A 1014A may select media content, for example, an audio file to be reproduced. In one example, a user interface 1140 on the user device A 1014A, as previously described with reference to FIGS. 11A and 11B may be used by a user to select an audio file to be reproduced. In one example, the request to reproduce the selected audio file may be sent to a streaming service, for example, application server A 1010, as shown in FIG. 10.

In block S1206, the selection of a physical space to render the reproduction of the media content is received. For example, a user of the user device A 1014A may select one of the physical spaces using the user interface 1140, using the icon 1144. The user selection may be transmitted to the streaming service, for example, application server A 1010, as shown in FIG. 10.

In block S1208, the eligibility of the selected physical space is validated. For example, a live space record 1152 corresponding to the selected physical space is retrieved. Information contained in the retrieved live space record 1152, for example, information retrieved from the ICB 1160 is used to determine whether the retrieved live space record 1152 is valid for use under specified circumstances. For example, the ICB 1160 may specify that the selected spatial acoustic model 1162 in the live space record 1152 is valid only on specified dates and times, or for ranges of dates and times. One application of this feature would enable an owner of the physical space, for example, a recording studio to effectively lease the use of the acoustic profile of the selected studio for a limited time period. Before or after the time window(s) specified by the ICB 1160, the spatial acoustic file corresponding to the selected space may no longer be used. Other conditions for use may also be specified in the ICB 1160.

In block S1210, a convolved media content is generated by using filter coefficients corresponding to the selected space, processing logic and other rendering parameters representative of the selected physical space. In one example, the user selection of the media content and physical space may be selectively transmitted to the spatial emulation appliance 1008, by the streaming service, for example, application server A 1010 as shown in FIG. 10. The spatial emulation appliance 1008 will generate a convolved media content, by using the filter coefficients, processing logic and other rendering parameters corresponding to the selected physical space. For example, the integrated convolution generator 720 will generate the convolved media content, using the selected filter coefficients.

In block S1212, the generated convolved media content is presented for reproduction. For example, the spatial emulation appliance 1008 may present the convolved media content to the streaming service, for example, application server A 1010. The application server A 1010 may in turn stream the convolved media content to the user device A 1014A for reproduction. In some examples, the application server A 1010 may include or add one or more fields to the convolved media content and present the convolved media content for reproduction by the user device A 1014A.

In block S1214, a NFT indicative of the authenticity of the selected physical space is generated. In one example, a NFT 1150 with various fields as previously described with reference to FIG. 11C is generated.

In block S1216, the generated NFT indicative of the authenticity of the physical space is presented. For example, an identifier corresponding to the generated NFT is presented to a user of the user device A 1014A. In one example, the generated NFT may use block-chain technology to store elements of the generated NFT.

Example Application 1

People who create professional audio or audio-visual content, including but not limited to musicians, recording engineers, sound designers, animators, producers, and mixers often struggle with creating the desired acoustic effect due to the limitations of traditional headphones. This requires them to seek professionally-treated physical spaces to deliver professional-sounding content. These spaces typically include high fidelity loudspeakers, carefully designed positioning and geometry of hard surfaces within the treated space such as walls, ceiling, and other reflective objects all of which shape the resulting sound. These spaces are designed to deliver optimal sound experiences when the listener is located at a well-defined position, sometimes referred to as the "sweet spot" in the room. However, it is not practical for many audio professionals to utilize sonically treated spaces, such as recording studios. These spaces typically cost money, may be in inconvenient locations, and require advance reservations. These monetary and logistical constraints lead many professionals to prefer to work with headphones.

The physical space emulation described in this disclosure enables creating all of the effects of a professionally treated physical space within headphones, whenever and wherever inspiration strikes. By modeling multiple different recording studio spaces and allowing the user to alternately select these spaces, the content creator can even test their work in different virtual studios with the same set of headphones—even if the studios are geographically dispersed. For example, a recording engineer can test their work in an emulated studio located in Los Angeles, another studio in London, and a third in Nashville, all with the same set of headphones.

In some cases, the use of the physical space being emulated may be limited to certain circumstances such as date and time. In these cases, the owner or controller of the recording studio brand is able to provide temporarily access and use of a virtual physical space to a content creator by limiting the creators' access to the virtual physical space on a time-limited basis. When the lease expires, the content creator is no longer able to access the virtual studio. Information related to valid dates and times for the use of a particular live space 1151 may be encoded within the ICB 1160.

Example Application 2

Our perception is naturally tuned to sense stereo sound in three-dimensional space. Traditional stereo headphones isolate our two ears and destroy that perception. Many people prefer to perceive sound with a sensation of emulated three-dimensional space. For example, music sounds more natural and less fatiguing according to this disclosure and is generally more desirable. Since most music is created in carefully designed recording studios, adding emulation of a studio space to music allows the listener to enjoy a sonic experience that is similar to that intended by the producer, recording engineer and artist creators. Additionally, performance venues can also be emulated, allowing the listener to experience music as if she were hearing it in person. A dance club, concert hall, outside concert venue, or any other physical space can be modeled and applied to any audio content.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

The invention claimed is:

1. A method for enhancing audio reproduced by an audio reproduction device, including:
providing a spatial emulation appliance with a processor and memory;
generating a live space record indicative of a plurality of attributes associated with a physical space, wherein, the live space record including an information and control block, wherein, the information and control block including a valid usage period for the live space record;
receiving a media content for reproduction;
receiving a selection of the physical space to render the reproduction of the media content;
during the valid usage period for the live space record, generating a convolved media content using filter coefficients representative of the selected physical space; and
presenting the convolved media content for reproduction.

2. The method of claim 1, further including:
disposing the spatial emulation appliance in an audio reproduction device.

3. The method of claim 1, wherein presenting the media content for reproduction further including,
converting the convolved media content in digital form to an analog convolved media content;
selectively modifying the analog convolved media content by an analog output tuner; and
presenting the modified analog convolved media content to an audio reproduction device, for reproduction.

4. The method of claim 1, wherein, the selection of the physical space is based on an attribute defining a specific physical space selected by a user.

5. The method of claim 1, further including, performing a machine analysis of the media content to determine specific physical space optimal for the reproduction of the media content.

6. A method for enhancing audio reproduced by an audio reproduction device, including:
providing a spatial emulation appliance with a processor and memory;
generating a live space record indicative of a plurality of attributes associated with the selected physical space;
generating a non-fungible token (NFT), the generated NFT including the live space record, and a certificate of authenticity of the selected physical spaces receiving a media content for reproduction;

receiving a selection of a physical space to render the reproduction of the media content;

generating a convolved media content using filter coefficients representative of the selected physical space; and presenting the convolved media content for reproduction.

7. A system to enhance audio reproduced by an audio reproduction device, including:

a spatial emulation appliance with a processor and memory;

a live space record is generated, the live space record indicative of a plurality of attributes associated with the selected physical space, wherein, the live space record includes an information and control block, wherein, the information and control block includes a valid usage period for the live space record;

media content for reproduction configured to be received by the spatial emulation appliance;

a selection of a physical space to render the reproduction of the media content configured to be received by the spatial emulation appliance;

convolved media content is generated by the spatial emulation appliance using filter coefficients representative of the selected physical space; and the convolved media content is presented for reproduction.

8. The system of claim 7, wherein, the spatial emulation appliance is disposed in an audio reproduction device.

9. The system of claim 7, wherein, the convolved media content in digital form is converted to an analog convolved media content by a D/A converter;

the analog convolved media content is selectively modified by an analog output tuner; and the modified analog convolved media content is presented to an audio reproduction device, for reproduction.

10. The system of claim 7, wherein, the selection of the physical space is based on an attribute defining a specific physical space selected by a user.

11. The system of claim 7, a machine analysis of the media content is performed to determine specific physical space optimal for the reproduction of the media content.

12. A system to enhance audio reproduced by an audio reproduction device, including:

a spatial emulation appliance with a processor and memory;

a live space record is generated, the live space record indicative of a plurality of attributes associated with the selected physical space;

a non-fungible token (NFT) is generated, the generated NFT describing the live space record, and a certificate of authenticity of the selected physical space;

media content for reproduction configured to be received by the spatial emulation appliance;

a selection of the physical space to render the reproduction of the media content configured to be received by the spatial emulation appliance;

convolved media content is generated by the spatial emulation appliance using filter coefficients representative of the selected physical space; and the convolved media content is presented for reproduction.

* * * * *